United States Patent Office 3,480,641
Patented Nov. 25, 1969

3,480,641
METAL PHTHALOCYANINE DYESTUFFS CONTAINING A DIHALOISOTHIAZOLE CARBOXAMIDO GROUP
Karl-Heinz Schündehütte, Opladen, and Kersten Trautner, Cologne-Stammheim, Germany (both % Farbenfabriken Bayer AG., Leverkusen, Germany)
No Drawing. Original application July 6, 1965, Ser. No. 469,907. Divided and this application Dec. 29, 1965, Ser. No. 517,424
Claims priority, appilcation Germany, July 17, 1964, F 43,472
Int. Cl. C07f 107/00; D06p 3/24; C07d 91/34
U.S. Cl. 260—299                                         3 Claims

ABSTRACT OF THE DISCLOSURE

Dyestuffs of the formula

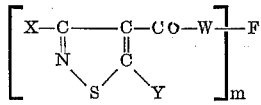

wherein F is a radical of an organic dyestuff, W is a bridge member, X and Y are halogen atoms, arylthio or aryloxy, and m is an integer. The dyestuffs of this invention are particularly suitable for dyeing textile materials containing nitrogen or hydroxyl groups, i.e., cellulose, wool, silk, synthetic polyamide, and polyurethane.

---

This application is a division of copending application Ser. No. 469,907, filed July 6, 1965, now abandoned.

The present invention relates to new valuable dyestuffs of the general formula

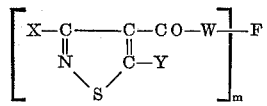
                                                                                                             (I)

In this formula, F denotes the radical of an organic dyestuff, W is a bridge member, X and Y are halogen atoms, arylthio groups of aryloxy groups, and m is an integer.

The dyestuffs can belong to various classes, for example, to the series of metal-free or metal-containing mono- or polyazo dyestuffs, metal-free or metal-containing azoporphin dyestuffs, preferably phthalocyanine dyestuffs, anthraquinone, oxazine, dioxazine, triphenylmethane, nitro, azomethine, benzathrone, and dibenzathrone dyestuffs and of polycyclic condensations compounds of anthraquinone, benzathrone, and dibenzathrone compounds.

In the dyestuffs of the general Formula I, the radical

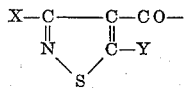
                                                                 (II)

is linked with the dyestuff molecule via any bridge member. The —NH— group is of special interest as a bridge member. However, the carboxyl group can also be linked to, for example, a secondary amino group or an amide group, e.g. a sulphonamide or carbonamide, aminotriazine or aminodiazine group. The amino group can, in turn, be linked to the basic dyestuff molecule, i.e. to an aromatic nucleus of the dyestuff molecule, directly or via an alkylene, aralkylene, or arylene group. If the bridge members W contain heterocyclic ring systems, such as triazinylamino and pyrimidinylamino radicals, these may also contain reactive halogen atoms.

The preferred bridge member, W, may be represented by the following group:

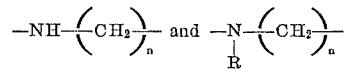

wherein the N atom is connected with the CO grouping of the isothiazolyl radical; R is lower alkyl or lower alkyl substituted by OH; and n is 0 or 1.

The preferred reactive substituents X and Y in the isothiazole radical are halogens, such as chlorine and bromine.

Dependent upon the type of their substituents, the new dyestuffs of the Formula I can be water-soluble as well as barely soluble or insoluble in water. The radical F may contain the substituents customary for the dyestuffs concerned, such as sulphonic acid, carboxylic acid, possibly substituted sulphonamide, sulphone, alkylamino-aralkylamino, arylamino, acylamino, nitro, cyano, halogen, hydroxyl, alkoxy, thioether, azo groupings and the like. The dyestuffs may, moreover, contain groupings capable of fixation, such as mono- or dihalotriazinylamino, mono-, di- or trihalo-pyrimidinyl-amino, 2,3-dihaloquinoxaline-6-carbonyl- or -6-sulphonylamino, 1,4-dihalophthalazine-6-carbonyl- or -6-sulphonylamino, 2-halobenzothiazole-5-carbonyl- or -5-sulphonylamino, esterified sulphonic acid alkoxyamide and alkoxysulphone groups, sulphofluoride, haloalkylamino, acryloylamino, haloacylamino groups and the like.

The new dyestuffs can be synthesized by various methods. For example, dyestuffs or primary dyestuff products which contain amino or amide groups and have a reactive hydrogen atom at the amine or amide nitrogen, can be reacted with compounds of the general formula

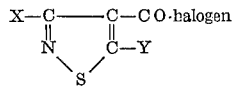
                                                                                                             (III)

in which X and Y have the meaning given above and "halogen" stands for a halogen atom, preferably chlorine, and in the case where primary dyestuff products are used, these can be transformed in a suitable manner into the desired end dyestuffs.

Dependent upon the number of reactive groupings in the dyestuff radical or in the dyestuff intermediates, which are suitable for the conversion, one or more groupings of the Formula II can be incorporated with the dyestuffs. In most cases, the number m will not exceed 4, but it is also possible to synthesize dyestuffs, especially those of a higher molecular structure, with more than 4, e.g. up to 8, groupings of the Formula II.

The intermediate products of the Formula III are in part known from the literature (cf. e.g. J. Org. Chem., 29, 660 [1964]).

Among the great number of dyestuffs obtainable according to the present process those products are especially easily accessible which are derived from amino group-containing azo dyestuffs of the benzene-azo-benzene, benzene-azo-naphthalene, naphthalene-azo-naphthalene, benzene-azo-aminopyrazole and -pyrazolone series and from the hetero-azo-aryl series and the aminoanthraquinone series with nuclear-positioned and/or externally linked amino groups, by reaction with compounds of the Formula III.

The new reactive dyestuffs can be produced not only by starting from the finished dyestuffs; it is also possible to react suitable coupling components which contain amino or amide groups and have at least one reactive hydrogen atom at the amino or amide group, with compounds of the Formula III to form preliminary products which are then coupled with suitable diazonium compounds. Inversely, diazonium compounds which contain reactive radicals of the Formula II can be coupled with suitable azo components to produce the azo dyestuffs (I) to be obtained according to the present process.

The new dyestuffs are extremely valuable products which are suitable for various purposes of application. The water-soluble compounds are of special interest for the dyeing of textile materials containing nitrogen or hydroxyl groups, especially of textile materials of native and regenerated cellulose, further, of wool, silk, synthetic polyamides and polyurethane fibers. Due to the reactive substituents X or Y in the isothiazole radical, the products are particularly well suited as reactive dyestuffs for dyeing cellulose materials by the methods recently disclosed for this purpose. The fastness properties attained, especially the fastness to wet processing, are excellent.

For dyeing cellulose, the dyestuffs are preferably used in an aqueous solution to which compounds of alkaline reaction, such as alkali metal hydroxide or alkali metal carbonate, or compounds convertible into substances of alkaline reaction, such as alkali metal bicarbonate, may be added. Further adjuvants can be added to the solution, provided they do not react with the dyestuffs in an undesirable manner. Such additives are, for example, surface-active substances, such as alkylsulphates, or compounds preventing migration of the dyestuff, or dyeing assistants such as urea (for improving the solubility and fixation of the dyestuffs), or inert thickeners such as oil-in-water emulsions, tragacanth, starch, alginate or methyl cellulose.

The solutions or pastes thus prepared are applied to the material to be dyed, for example, by padding on the foulard (short bath) or by printing, and subsequently heated for some time at an elevated temperature, preferably at 40–150° C. Heating can be performed in the hot-flue, in a steaming apparatus, on heated collars or by introducing the material into heated concentrated salt baths, using these methods singly or in any sequence.

When a padding liquor or dyebath without alkali is used, the dry material is subsequently passed through a solution of alkaline reaction to which sodium chloride or Glauber's salt is added. The addition of salt reduces the migration of the dyestuff from the fiber.

The material to be dyed can also be pretreated with one of the aforesaid acid-binding agents, subsequently treated with the solution or paste of the dyestuff, and, finally, fixed at an elevated temperature as described above.

In the so-called cold-batch padding process, the subsequent heating of the padded fabric can be saved by storing the fabric for some time at room temperature. In this process, sodium carbonate is preferably used as alkali.

For printing materials containing hydroxyl groups, a printing paste is used which consists of the dyestuff solution, a thickening agent such as sodium alkinate, and a compound of alkaline reaction or splitting off alkali when heated, such as sodium carbonate, sodium phosphate, potassium carbonate, potassium acetate or sodium and potassium bicarbonate, and the printed material is rinsed and finally soaped, if desired.

If the dyestuffs contain groupings which form metal complexes, the fastness properties of the dyeings and prints can frequently be improved by an after-treatment with metal-yielding agents, such as copper salts, e.g. copper sulphate, chromium, cobalt and nickel salts, such as chromium acetate, cobalt sulphate or nickel sulphate.

Textile materials which contain amide groups, such as wool, silk, synthetic polyamide and polyurethane fibers, are generally dyed by the methods customary for this purpose in an acid to neutral medium; a final raising of the pH value of the dyebath, for example, to a pH of 6.5–8.5 being sometimes of advantage.

The dyestuffs are applied to a synthetic polyamide fabric, for example, as solutions, or, preferably, in the dispersed form and subsequently after-treated, possibly together with preferably small amounts of acid-binding agents, such as sodium carbonate. Especially advantageous results are achieved with those dyestuffs which are insoluble or only barely soluble in water. These are worked up by known methods with the addition of the known assistants into a dyestuff dispersion and applied as such in the dyebath and/or padding liquor, or in a printing paste. The assistants suitable for this application are, inter alia, compounds which prevent the migration of the dyestuff on the fiber, such as cellulose ethers, alkali metal chlorides and sulphates; wetting agents, such as condensation products from ethylene oxide and fatty alcohols or phenols, sulphonated fatty alcohols; solvents, such as thiodiglycol; and thickening agents, such as starch, tragacanth, alginate thickening, gum arabic, etc.

The after-treatment of the dyeings, impregnations and prints obtained on fabrics of polyamide fibers is carried out, preferably, at a temperature of 50–110° C. for a period of 5–60 minutes. Also in this case the fastness properties of the dyeings can sometimes be improved with metal-yielding agents, such as copper salts, e.g. copper sulphate, or chromium, cobalt and nickel salts, such as chromium acetate, cobalt sulphate or nickel sulphate, provided that the dyestuffs employed contain groupings forming metal complexes.

The dyeings and prints obtainable with the new dyestuffs are generally distinguished by good to very good fastness properties, especially by excellent fastness to wet processing.

The following examples are given for the purpose of illustrating the invention, and unless otherwise noted, all parts are by weight.

Example 1

To a solution of 34.7 parts of 2-aminonaphthalene-4, 8-disulphonic acid sodium salt and 7 parts of sodium nitrite in 300 parts of water, are added while cooling with ice, 28 parts by volume of concentrated hydrochloric acid, and the mixture is stirred at 0–10° C. for 30 minutes. After removing the excess nitrous acid, 10.7 parts of 3-aminotoluene dissolved in 10 parts by volume of concentrated hydrochloric acid and 150 parts of water are added and the coupling is completed by neutralizing the mixture to a pH of 3–5. The resultant aminoazo dyestuff is salted out, filtered off with suction, washed and then dissolved again at a pH of 7 in 700 parts of water with the addition of a sodium hydroxide solution. The aqueous solution is then mixed with 21.6 parts of 3,5 - dichloro - 1,2 - isothiazole-4-carboxylic acid chloride (B.P. 102° C./8 mm. Hg) dissolved in 50 parts of acetone and vigorously stirred. By the reaction which sets in, the mixture is spontaneously heated to 35–40° C.; the liberated hydrochloric acid is neutralized with a sodium carbonate solution, until free amino groups can no longer be detected. The resultant dyestuff of the formula

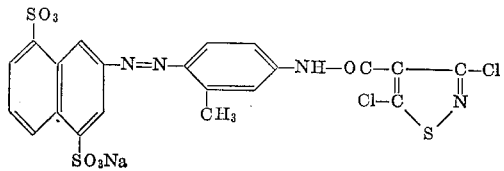

is salted out with 80 parts of sodium chloride, pressed off, washed, and dried at 40–50° C. in a vacuum. It is a yellow powder which dissolves in water with a yellow color.

When a cellulose fabric is printed with a printing paste which contains, per kilogram, 15 g. of the dyestuff, 100 g. of urea, 300 ml. of water, 500 g. of alginate thickening (60 g. of sodium alginate per kg. of thickening), 2 g. of sodium hydroxide and 10 g. of sodium carbonate, and which has been made up with water to 1 kilogram, followed by drying, steaming at 105° C. for 8 minutes, rinsing with hot water and boiling with soap, an intense reddish-yellow print of good fastness to washing and light is obtained.

Example 2

0.1 mol of the copper complex compound of the formula

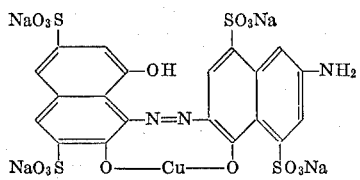

(prepared according to the instructions of German patent specification No. 1,117,235 by coupling diazotized 1-amino-8-[benzene-sulphonyloxy]-naphthalene-disulphonic acid-[3,6] in a soda-alkaline medium with the equivalent amount of 2-acetylamino-5-hydroxynaphthalene-disulphonic acid-[4,8], conversion of the monoazo compound into the copper complex by oxidative coppering and hydrolysis of the acetyl and benzene-sulphonyl groups), is dissolved in 2500 parts by volume of water at 35° C. at a pH of 6–6.5 and mixed at this temperature with a solution of 0.1 mol of 3,5-dichloro-1,2-isothiazole-4-carboxylic acid chloride in 50 ml. of acetone. During condensation a pH of 6–6.5 is maintained by the addition of a sodium carbonate solution. When the reaction is completed, the dyestuff is salted out and isolated. After drying, the dyestuff is a dark powder which dissolves in water with a blue color.

100 parts by weight of a cotton fabric are padded on the foulard at room temperature with an aqueous solution containing 2% of the dyestuff, 15 g./liter of sodium hydrogen carbonate and 150 g./liter of urea, dried intermediately, heated at 140° C. for 10 minutes, then rinsed and boiled with soap. The fabric is dyed in very clear blue shades fast to wet processing.

Example 3

In 300 parts of water at 50° C. are dissolved at a pH of 7–8, 46 parts of the dyestuff obtained by coupling diazotized 2-aminonaphthalene-4,8-disulphonic acid with 3-methylamino-toluene following the procedure of Example 1, and mixed in the presence of excess sodium acetate or calcium carbonate at 35–40° C. portionwise with a total of 31 parts of 3,5-dichloro-1,2-isothiazole-4-carboxylic acid chloride, and stirred at the same temperature, until a sample no longer shows a change of color when acid is added. The resultant dyestuff of the formula

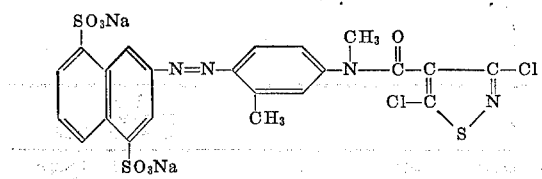

is salted out, filtered off with suction, washed and dried.

A cotton fabric is impregnated with a solution at 20–25° C., which contains, per liter of liquor, 20 g. of the above dyestuff and 0.5 g. of a non-ionic wetting agent (e.g. a polyethoxylated oleyl alcohol) as well as 150 g. of urea and 15 g. of sodium bicarbonate. The fabric is subsequently squeezed between two rubber rollers to a moisture content of about 100%. After an intermediate drying at 50–60° C., the material is heated at 140° C. for 10 minutes, and the dyeing thus obtained is thoroughly rinsed with hot water and treated at the boil for 20 minutes with a solution containing, per liter, 5 g. of Marseilles soap and 2 g. of sodium carbonate. After rinsing and drying, an intense reddish-yellow dyeing of good fastness to wet processing, rubbing and light is obtained.

In the following table the diazo components and the coupling components having linked thereto through the amino group the reactive component 3,5-dichloro-1,2-isothiazole-4-carboxylic acid chloride are listed, from which dyestuffs can be synthesized following the procedure given in Examples 1–3; the shades obtained by one of the methods of application described above are also stated in the table.

| Example Number | Diazo component | Coupling component | Shade |
|---|---|---|---|
| 4 | 2-aminonaphthalene-4,8-disulphonic acid | 1-amino-2-methoxy-5-methylbenzene | Yellow. |
| 5 | 1-aminonaphthalene-3,6-disulphonic acid | 1-amino-3-methylbenzene | Do. |
| 6 | 2-aminonaphthalene-5,7-disulphonic acid | do | Do. |
| 7 | 2-aminonaphthalene-6,8-disulphonic acid | do | Do. |
| 8 | 4-aminoazobenzene-3,4'-disulphonic acid | do | Brown-yellow. |
| 9 | 2-(3'-sulpho-4'-amino-phenyl)-6-methylbenzothiazole-7-sulphonic acid | do | Yellow. |
| 10 | 2-aminonaphthalene-4,8-disulphonic acid | 1-amino-3-acetylaminobenzene | Do. |
| 11 | do | Aniline | Do. |

Example 12

Into a solution of 36.5 parts of the sodium salt of 1-amino-8-hydroxynaphthalene-3,6-disulphonic acid in 100 parts of water are introduced with good stirring, 21.6 parts of 3,5-dichloro-1,2-isothiazole-4-carboxylic acid chloride, and the mixture is stirred at 20–40° C., while continuously neutralizing the liberated hydrochloric acid to a pH of 6–7, until free amino groups can no longer be detected. The dyestuff intermediate thus obtained is coupled, after diluting it with 600 parts of water and adding 12 parts of sodium carbonate, at 5–10° C. with 17.5 parts of diazotized 2-aminobenzene-sulphonic acid dissolved in 200 parts of water. The dyestuff formed at a final pH of about 7 and having the formula is salted out with 100 parts of sodium chloride, filtered off with suction, washed and dried at 40–50° C. in a vacuum. The dyestuff forms small red needles which have a metallic luster and which readily dissolve in water with a red color.

When a fabric of cotton or regenerated cellulose is dyed or printed with this dyestuff by one of the methods described in Examples 1–3, clear bluish-red dyeings and prints of good fastness to wet processing, rubbing, and light are obtained.

Equally good results are obtained by the following process:

50 grams of cotton skein are dyed in 1 liter of a dyebath containing 1.5 g. of the above dyestuff by raising the temperature from 20° C. to about 40° C. within 30 minutes while adding a total of 50 g. of sodium carbonate and treating at the same temperature for 60 minutes. After rinsing, boiling with soap and drying, a bluish-red dyeing of good fastness to wet processing, rubbing, and light is obtained.

In the following table the shades of further dyestuffs are listed, which can be synthesized from the likewise mentioned diazo components and coupling components having linked thereto through the amino group the reactive component of the foregoing example, in analogy with the instructions of Example 12 or also by reaction of the corresponding aminoazo dyestuffs with the reactive component, and which can be dyed or printed on cellulose materials by one of the methods described above.

| Example Number | Diazo component | Coupling component | Shade |
|---|---|---|---|
| 13 | 1-aminobenzene-2-sulphonic acid | 1-(3'-aminobenzoylamino)-8-hydroxynaphthalene-3,6-disulphonic acid. | Red. |
| 14 | 1-amino-2-carboxybenzene-4-sulphonic acid | 1-amino-8-hydroxynaphthalene-3,6-disulphonic acid | Red. |
| 15 | 1-amino-4-methylbenzene-2-sulphonic acid | do | Red. |
| 16 | 1-amino-3-(2'-[4''-sulphophenylamino]-4'-chlorotriazine-1',3',5'-yl-6')-aminobenzene-6-sulphonic acid. | do | Red. |
| 17 | 1-aminobenzene-2-sulphonic acid | 2-amino-5-hydroxynaphthalene-7-sulphonic acid | Orange. |
| 18 | 1-amino-3-(2'-[4''-sulphophenylamino]-4'-methylamino-triazine-1',3',5'-yl-6')-aminobenzene-6-sulphonic acid | do | Do. |
| 19 | 1-aminobenzene-2-sulphonic acid | 2-methylamino-5-hydroxy-naphthalene-7-sulphonic acid | Do. |
| 20 | 1-amino-4-acetylamino-6-sulphonic acid | do | Scarlet. |
| 21 | do | 2-amino-5-hydroxynaphthalene-7-sulphonic acid | Do. |

Example 22

Into a solution of 21 parts of the sodium salt of 1,3-diaminobenzene-6-sulphonic acid in 100 parts of water, are introduced with good stirring 21.6 parts of finely powdered 3,5-dichloro-1,2-isothiazole-4-carboxylic acid chloride, and the mixture is stirred at 20–40° C., while continuously neutralizing the liberated hydrochloric acid to a pH of 6–7, until a sample, when diazotized and coupled with 1-hydroxy-naphthalene-4-sulphonic acid, gives a clear yellowish-red coloration. The dyestuff intermediate formed is directly diazotized, after the addition of ice, with 7 parts of sodium nitrite and 28 parts of concentrated hydrochloric acid and subsequently combined with a previously prepared solution of 47 parts of the sodium salt of 1-benzoylamino-8-hydroxy-naphthalene-3,6-disulphonic acid and 12 parts of sodium carbonate in 200 parts of water, whereupon coupling takes place and the dyestuff of the formula

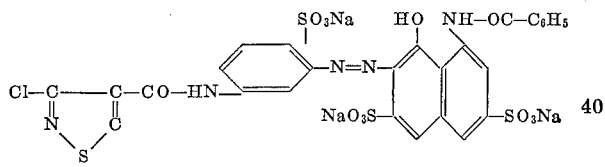

is formed, which is salted out, filtered out, filtered off with suction, washed and dried at 40–50° C. in a vacuum. The dyestuff readily dissolves in water with a red color and yields clear bluish-red dyeings and prints on cellulose materials by one of the methods described above.

In the following table, there are listed the shades and the pH value of the coupling medium of dyestuffs which are produced in analogy with the instructions of Example 22 from the coupling component and a diazo component containing a further, preferably acylatable, amino group, and linked with the reactive component of the foregoing example through an amino group. The methods mentioned above can be used for dyeing and printing cellulose materials with the dyestuffs of the table.

Example 35

In 1500 parts of water are dissolved at a pH of 7, 51.6 parts of the dyestuff of the formula

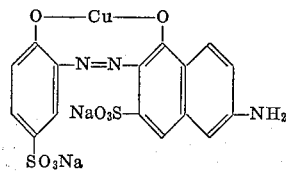

obtained by diazotization of 1-hydroxy-2-aminobenzene-4-sulphonic acid and coupling with 2-amino-5-hydroxy-naphthalene-7-sulphonic acid in water/pyridine in the presence of sodium carbonate, followed by treatment with a copper-yielding agent, and 21.6 parts of 3,5-dichloro-1,2-isothiazole-4-carboxylic acid chloride are introduced at 20–30° C. with good stirring and the liberated hydrochloric acid is continuously neutralized to a pH of 5–7. When free amino groups can no longer be detected, the resultant reactive dyestuff of the formula

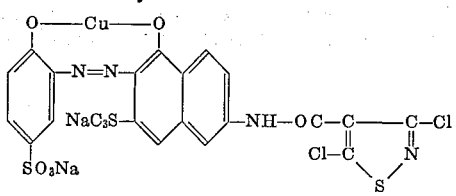

is salted out, pressed off, washed and dried at 40–50° C. in a vacuum. Fabrics of cellulose materials can be dyed with this dyestuff by one of the methods mentioned above in ruby shades fast to wet processing, rubbing, and light.

In the following table there are listed the heavy metal complexes of further aminoazo dyestuffs linked with the reactive component of the foregoing example through the amino group as well as the shades of these dyestuffs on cellulose materials. The production of the aminoazo dyestuffs and their metal complexes and the reaction of the latter with the reactive components can be carried out in analogy with the instructions of Example 35.

| Example Number | Diazo component | Coupling component | pH of coupling medium | Shade |
|---|---|---|---|---|
| 23 | 1,3-diaminobenzene-4-sulphonic acid | 2-aminonaphthalene-5,7-disulphonic acid | 4–5 | Orange. |
| 24 | do | 2-aminonaphthalene-3,6-disulphonic acid | 4–5 | Do. |
| 25 | do | 2-N-methylamino-8-hydroxynaphthalene-6-sulphonic acid | 4–5 | Do. |
| 26 | do | 1,(3'-5'-dichloro-1',2'-thiazole-4'-carbonamido)-8-hydroxy-naphthalene-3,6-disulphonic acid. | 7–8 | Red. |
| 27 | do | 1-(2',4'-dihydroxy-triazin-1',3',5'-yl-6'-amino)-8-hydroxy-napthalene-3,6-disulphonic acid. | 7–8 | Red. |
| 28 | do | 1-(3'-,5'-dichloro-1'-2'-thiazole-4'-carbonamido)-8-hydroxynaphthalene-3,6-disulphonic acid. | 7–8 | Red. |
| 29 | do | 2-hydroxy-naphthalene-3,6-disulphonic acid | 8 | Scarlet. |
| 30 | do | 1-(3'-sulphophenyl)-3-methylpyrazolene-5 | 6 | Yellow. |
| 31 | do | 1-(2',5'-dichloro-4'-sulphophenyl)-3-methylpyrazolone-5 | 6 | Do. |
| 32 | do | 1-(5',7'-disulpho-naphtyhl-2'-)-3-methylpyrazolone-5 | 6 | Do. |
| 33 | 1,4-diaminobenzene-3-sulphonic acid | 2-amino-8-hydroxy-naphthalene-6-sulphonic acid | 4–4.5 | Red. |
| 34 | do | 2-acetylamino-5-hydroxynaphthalene-7-sulphonic acid | 6–7 | Scarlet. |

| Example Number | Aminoazo dyestuff | Complex-linked heavy metal | Shade |
|---|---|---|---|
| 36 | 1-hydroxy-2-aminobenzene-4,6-disulphonic acid→2-amino-5-hydroxy-naphthalene-7-sulphonic acid | Cu | Ruby. |
| 37 | 1-hydroxy-2-aminobenzene-4-sulphonic acid→2-ethylamino-5-hydroxy-naphthalene-7-sulphonic acid | Cu | Do. |
| 38 | 1-amino-2-hydroxy-6-nitro naphthalene-4-sulphonic acid→2-amino-5-hydroxynaphthalene-7-sulphonic acid. | Cu | Do. |
| 39 | do | Cr | Greenish grey. |
| 40 | 1-amino-2-hydroxy-5-methyl-sulphonyl-benzene→1-amino-8-hydroxy-naphthalene-3,6-dissulphonic acid. | Cu | Violet. |
| 41 | do | Co | Grey. |
| 42 | do | Cr | Greenish-black. |
| 43 | 1-amino-2-methylbenzene-4-sulphonic acid→1-amino-2-hydroxy-5-methylbenzene→1-amino-8-hydroxy-naphthalene-4,6.disulphonic acid. | Ct | Do. |
| 44 | (1-amino-2-chlorobenzene-4-sulphonic acid→1-hydroxy-2-acetylaminobenzene), saponified,→1-amino-8-hydroxy-naphthalene-3,6-disulphonic acid. | Cu | Navy blue. |
| 45 | do | Co | Grey. |
| 46 | 1-amino-8-hydroxy-naphthalene-4-sulphonic acid←1-hydroxy-2,6-diaminobenzene-4-sulphonic acid→1,3-dihydroxybenzene. | Co | Black. |
| 47 | 1-amino-8-hydroxy-naphthalene-3,6-disulphonic acid←1-hydroxy-2,6-diaminobenzene-4-sulphonic acid→2-hydroxynaphthalene. | Co | Do. |
| 48 | 1-amino-8-hydroxynaphthalene-4-sulphonic acid←1-hydroxy-2,6-diaminobenzene-4-sulphonic acid→3-methyl-pyrazolone-(5). | Co | Do. |

Example 49

The copper-phthalocyanine-tetrasulphochloride freshly prepared in the usual manner by the action of chlorosulphonic acid and thionyl chloride on copper-phthalocyanine, or of the isomeric copper-phthalocyanine-tetrasulphochloride synthesized from 1-sulphobenzene-3,4-dicarboxylic acid via the corresponding copper-phthalocyanine-tetrasulphonic acid, 96 parts (referred to 100% goods), is suspended in the form of the moist, thoroughly washed suction filter cake in 500 parts of water and 500 parts of ice, a solution of 50 parts of the sodium salt of 1,3-diaminobenzene-4-sulphonic acid in 500 parts of water is added and the pH value is adjusted to 8.5 with sodium carbonate. The suspension is stirred at room temperature for 24 hours a pH, value of 8.5 being constantly maintained by the continuous addition of sodium carbonate. The resultant condensation product is precipitated at a pH of 1-2 by the addition of sodium chloride, filtered off with suction, washed and then redissolved neutral in 1000 parts of water. A solution of 65 parts of 3,5-dichloro-1,2-isoethiazole-4-carboxylic acid chloride in 100 parts of acetone is added dropwise with intense stirring to the blue solution, and the mixture is stirred at 30-40° C., while continuously neutralizing the liberated hydrochloric acid to a pH of 5-7, until free amino groups can no longer be detected. The reactive dyestuff of the formula

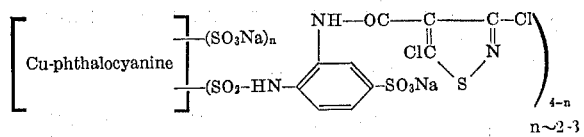

thus obtained is salted out, washed and dried at 30-40° C. in a vacuum. It is a dark blue powder which dissolves in water with a blue color and dyes cotton and regenerated cellulose by one of the dyeing or printing methods mentioned above, in clear blue shades of good fastness to wet processing, rubbing, and light.

Instead of 96 parts of copper-phthalocyanine-tetrasulphochloride, there can also be used 87 parts (referred to 100% goods) of the copper- or nickel-phthalocyanine trisulphochloride obtainable by the action of chlorosulphonic acid on copper- or nickel-phthalocyanine, in the form of the moist suction filter cake thoroughly washed with ice-water the procedure being otherwise the same ts that of Example 49; reactive dyestuffs yielding clear blue shades are then likewise obtained.

By following the procedure of Example 49, but starting from 87 parts of copper-phthalocyanine trisulphochloride and using, instead of 50 parts of the sodium salt of 1,3-diaminobenzene-4-sulphonic acid, 90 parts of the sodium salt of 4,4'-diamino-diphenyl-2,2'-disulphonic acid or 90 parts of the sodium salt of 4,4'-diaminostilbene-2,2'-disulphonic acid, reactive dyestuffs are again obtained which dye cellulose materials by one of the methods mentioned above, in clear blue shades fast to wet processing, rubbing, and light.

When starting from 4',4'',4''',4''''-tetraphenyl-Cu-phthalocyanine, there is obtained after sulphochlorination, reaction with 1,3-phenylene-diamine-4-sulphonic acid and acylation with 3,5-dichloro-isothiazole-4-carboxylic acid chloride, a reactive dyestuff which dyes cellulose materials in the presence of acid-binding agents in clear green shades fast to wet processing and light.

Example 50

In 700 parts of water are dissolved 71 parts of the amino-anthraquinone dyestuff obtained by the recation of 1-amino-4-bromo-anthraquinone-2-sulphonic acid with excess 4,4-diamino-diphenyl-2,2'-disulphonic acid and 27 parts of 3,5-dichloro-isothiazole-4-carbzoxylic acid chloride are added at 20-30° C. with good stirring, and a pH of 6-7 is maintained by the continuous addition of a sodium carbonate solution. When amino groups can no longer be detected, the resultant dyestuff of the formula

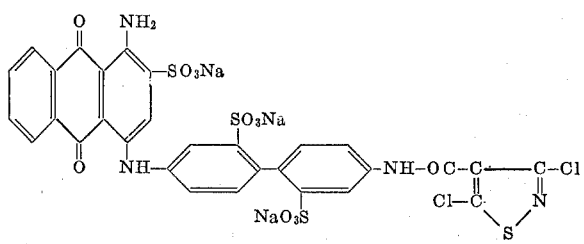

is salted out, filtered off with suction, washed and dried at 40° C. in a vacuum. It dyes cotton and regenerated cellulose by one of the methods mentioned above, in blue shades fast to wet processing, rubbing, and light.

By proceeding as described in Example 50, but using, instead of 71 parts of the starting dyestuff there employed, equivalent amounts of one of the following derivatives of 1 - amino-4-(aminoarylamino)-anthraquinone-2-sulphonic acid, similar dyestuffs are obtained in the dyeings which are likewise blue and have fastness properties similar to those of the dyestuff obtained above: 1-amino-4-(4'-amino - 2'-sulphophenylamino)-anthraquinone-2-sulphonic acid, 1 - amino - 4-(4'-aminophenylamino)-anthraquinone-2,6-disulphonic acid, isomeric mixture of 1-amino-4-(4'-aminophenylamino) - anthraquinone-2,5-and -2,8-disulphonic acid, isomeric mixture of 1-amino-4-(4'-amino-2'-sulphophenylamino)-anthraquinone-2,5- and -2,8-disulphonic acid, isomeric mixture of 1-amino-4-(3'-aminophenylamino)-anthraquinone-2,5- and -2,8-disulphonic acid, 1-amino-4-(3'- aminophenylamino) - anthraquinone-2,6-disulphonic acid, 1-amino-4-(3'-amino-4'-sulphophenylamino)-anthraquinone-2-sulphonic acid. With 1-amino-4 - (4'-[4''-amino-2''-sulphophenyl]-aminophenyl)-anthraquinone-2,6-disulphonic acid, reactive dyestuffs are obtained which dye in bluish-grey shades.

Example 51

By proceeding as described in Example 35, but using as starting material, instead of the copper-containing aminomonoazo dyestuff there employed, the equivalent amount of the chrominum complex of the aminoazo dyestuff obtained by coupling diazotized 1-amino-2-hydroxy-3-chlorobenzene-5-sulphonic acid with 1-[3'-(3''-aminophenyl)] - sulphonylimido - sulphonyl-phenyl-3-methyl-pyrazolone-(5), a reactive dyestuff is obtained which dyes cellulose materials by one of the methods described above, in yellow-brown shades of good fastness to wet processing, rubbing, and light.

Example 52

In 3000 parts by volume of water is dissolved at a pH of 6, 0.1 mol of the copper complex compound of the formula

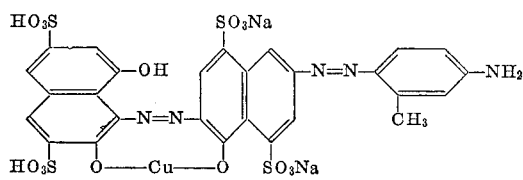

This solution is combined at a temperature of about 30° C., while stirring, with a solution of 21.6 parts (0.1 mol) of 3,5-dichloro-1,2-isothiazole-4-carboxylic acid chloride in acetone. The mixture is stirred until the condensation is completed, the dyestuff is separated by the addition of a little sodium chloride and isolated. The residue is washed with acetone and dried at room temperature under reduced pressure. A dark powder is obtained which dissolves in water with a green color nad dyes cotton by the methods described in Examples 1–3, in green shades.

A cotton fabric is impregnated with a solution at 20–25° C., which contains, per liter of liquor, 25 g. of the above dyestuff and 0.5 g. of non-ionic wetting agent (e.g. a polyethoxylated oleyl alcohol), 150 g. of urea and 20 g. of sodium carbonate. The fabric is subsequently squeezed between two rubber rollers to a moisture content of about 100%. After an intermediate drying at 50–60° C., the material is heated at 140° C. for 10 minutes and the dyeing thus obtained is thoroughly rinsed with hot water and treated at the boil for 20 minutes with a solution containing, per liter, 5 g. of Marseilles soap and 2 g. of sodium carbonate. After rinsing and drying, a green dyeing of good fastness to wet processing, rubbing, and light is obtained.

Clear red shades of good fastness properties are also obtained on cellulose materials by one of the other dyeing or printing processes described in Examples 1–3, 12, and 22.

Example 53

In 2000 parts by volume of water is dissolved at a pH of 6, 0.1 mol of a paste of the aminoazo compound of the formula

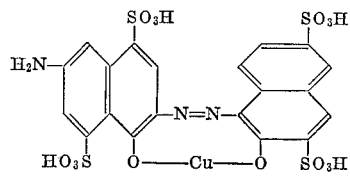

which is obtained by coupling the diazonium compound from 6-acetamino - 2 - aminonaphthalene-4,8-disuphonic acid with 2-hydroxynaphthalene-3,6-disulphonic acid, and saponification and conversion of the monoazo compound into the copper complex. The resulting solution is combined with a solution of 21.6 parts of 3,5-dichloro-1,2-isothiazole-4-carboxylic acid chloride. The reaction mixture is stirred at 30–35° C., until the condensation is completed, the pH of the reaction solution being maintained at 6–7 by the addition of sodium carbonate. When the reaction is completed, the dyestuff is salted out, isolated and dried in a vacuum.

The dried dyestuff is a dark powder which dissolves in water with a violet color and dyes cotton in the presence of alkali, in bluish-violet shades.

Example 54

An aqueous solution of 0.1 mol of the copper complex of the formula

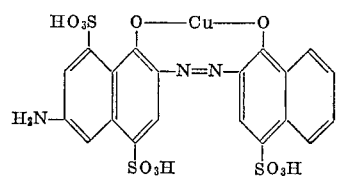

prepared according to the instructions of German patent specification No. 1,061,460 or 1,085,988, is combined in the usual manner with a solution of 21.6 parts of 3,5-dichloro-1,2-isothiazole-4-carboxylic acid chloride in acetone. A pH of 6–7 is maintained by the addition of $Na_2CO_3$ and when the reaction is completed, the dyestuff is isolated by salting out. In the dry state, it is a dark powder which dissolves in water with a violet color. Cotton fabrics are dyed in violet shades fast to light and wet processing.

Example 55

In 150 parts of water are dissolved 27.5 parts of 2-methylamino-5-hydroxynaphthalene - 7 - sulphonic acid sodium salt, mixed with 21.6 parts of 3,5-dichloro-1,2-isothiazole-4-carboxylic acid chloride and stirred at 35–40° C. for 30 minutes, while continuously neutralizing the resultant hydrochloric acid to a pH of 4–6 with a total of 34 parts by volume of a 16% sodium carbonate solution. The acylation is completed after about 2 hours, the pH is 6 and changes no more.

30 parts of sodium bicarbonate are then added, and a diazo suspension from 34 parts of the disodium salt of 2-aminonaphthalene-1,7-disulphonic acid in 200 parts of water is added dropwise at 40° C. within 15 minutes. The orange colored reactive dyestuff immediately formed, of the formula

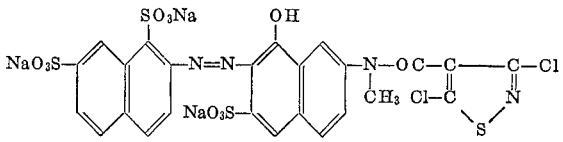

is further stirred for one hour, then completely separated by the addition of 80 parts of sodium chloride, filtered off, washed with a dilute sodium chloride solution and dried at 45° in a vacuum. The dyestuff dyes cellulose materials by the methods mentioned above, in reddish-orange shades of very good fastness to wet processing, and good fastness to chlorine.

By using in this example, instead of 21.6 parts of 3,5-dichloro-1,2-isothiazole - 4 - carboxylic acid, equivalent amounts of 3,5-dibromo-1,2-isothiazole-4-carboxylic acid bromide, a reactive dyestuff is obtained which dyes in orange shades and the dyeing properties are similar to those of the corresponding 3,5-dichloro derivative.

Orange to red reactive dyestuffs are obtained in an analogous manner by acylation of the aminonaphthol-sulphonic acids listed in column 3 of the following table with 3,5-dichloro-1,2-isothiazole-4-carboxylic acid chloride and coupling the resultant acylaminonaphthol-sulphonic acids with the diazo components mentioned in column 2.

| Example Number | Diazo component | Aminonaphtholsulphonic acid | Shade on cotton |
|---|---|---|---|
| 56 | 2-aminonaphthalene-1,7-disulphonic acid | 2-ethylamino-5-hydroxynaphthalene-7-sulphonic acid | Orange. |
| 57 | do | 2-(β-hydroxyethylamino)-5-hydroxynaphthalene-7-sulphonic acid | Do. |
| 58 | do | 2-amino-5-hydroxynaphthalene-7-sulphonic acid | Do. |
| 59 | do | 2-amino-5-hydroxynaphthalene-1,7-disulphonic acid | Do. |
| 60 | do | 2-amino-8-hydroxynaphthalene-6-sulphonic acid | Scarlet. |
| 61 | do | 2-amino-8-hydroxynaphthalene-3,6-disulphonic acid | Do. |
| 62 | 2-aminonaphthalene-1,5-disulphonic acid | 2-methylamino-5-hydroxynaphthalene-7-sulphonic acid | Orange. |
| 63 | do | 2-ethylamino-5-hydroxynaphthalene-7-sulphonic acid | Do. |
| 64 | do | 2-(β-hydroxyethylamino)-5-hydroxy-naphthalene-7-sulphonic acid | Do. |
| 65 | do | 2-amino-5-hydroxynaphthalene-7-sulphonic acid | Do. |
| 66 | do | 2-amino-5-hydroxynaphthalene-1,7-disulphonic acid | Do. |
| 67 | do | 2-amino-8-hydroxynaphthalene-6-sulphonic acid | Scarlet. |
| 68 | do | 2-amino-8-hydroxynaphthalene-3,6-disulphonic acid | Do. |
| 69 | 2-aminonaphthalene-1,5,7-trisulphonic acid | 2-amino-5-hydroxynaphthalene-7-sulphonic acid | Orange. |
| 70 | do | 2-methylamino-5-hydroxynaphthalene-7-sulphonic acid | Do. |
| 71 | do | 2-amino-8-hydroxynaphthalene-6-sulphonic acid | Scarlet. |
| 72 | 2-aminobenzene-sulphonic acid | 2-methylamino-5-hydroxynaphthalene-7-sulphonic acid | Orange. |
| 73 | do | 2-(β-hydroxyethylamino)-5-hydroxy-naphthalene-7-sulphonic acid | Do. |
| 74 | do | 2-amino-8-hydroxynaphthalene-6-sulphonic acid | Scarlet. |
| 75 | do | 2-amino-8-hydroxynaphthalene-3,6-disulphonic acid | Do. |
| 76 | do | 2-amino-5-hydroxynaphthalene-1,7-disulphonic acid | Orange. |
| 77 | 2-aminonaphthalene-1-sulphonic acid | 1-amino-8-hydroxynaphthalene-3,6-disulphonic acid | Bluish-red. |
| 78 | do | 1-amino-8-hydroxynaphthalene-4,6-disulphonic acid | Do. |
| 79 | 2-aminonaphthalene-1,5-disulphonic acid | 1-amino-8-hydroxynaphthalene-3,6-disulphonic acid | Do. |
| 80 | do | 1-amino-8-hydroxynaphthalene-4,6-disulphonic acid | Do. |
| 81 | do | 1-amino-8-hydroxynaphthalene-6-sulphonic acid | Do. |
| 82 | 2-aminonaphthalene-1,7-disulphonic acid | 1-amino-8-hydroxynaphthalene-3,6-disulphonic acid | Do. |
| 83 | do | 1-amino-8-hydroxynaphthalene-4,6-disulphonic acid | Do. |
| 84 | do | 1-amino-8-hydroxynaphthalene-6-sulphonic acid | Do. |
| 85 | 2-aminonaphthalene-1,5,7-trisulphonic acid | do | Do. |
| 86 | 1-amino-4-chlorobenzene-2-sulphonic acid | 1-amino-8-hydroxynaphthalene-3,6-disulphonic acid | Do. |
| 87 | 1-amino-2-methoxybenzene-5-sulphonic acid | do | Do. |
| 88 | 1-aminobenzene-2-carboxylic acid-4-sulphonic acid | do | Do. |
| 89 | 1-amino-4-acetylaminobenzene-2-sulphonic acid | do | Violet. |
| 90 | do | 1-amino-8-hydroxynaphthalene-4,6-disulphonic acid | Bluish-red. |

Example 91

In 450 parts of water are dissolved at a pH of 7, 56.8 parts of the diaminoazo dyestuff obtained by coupling diazotized 1-amino - 3 - acetylaminobenzene-6-sulphonic acid with 2-aminonaphthalene-5,7-disulphonic acid in an acetic acid medium and subsequent alkaline or acidic hydrolysis of the acetylamino group. After the addition of 21.6 parts of 3,5-dichloro-1,2-isothiazole-4-carboxylic acid chloride, the mixture is stirred at 45° C. for about 3 hours, while continuously neutralizing the liberated hydrochloric acid with a sodium carbonate solution. When the acylation is completed, the resultant dyestuff of the formula

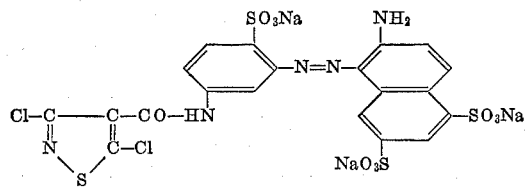

is salted out, filtered off, again dissolved in 4000 parts of water at 60° C., filtered and separated from the filtrate in a completely pure state by the addition of 400 parts of sodium chloride. The dyestuff is dried in the usual manner at 45° C. in a vacuum. It dyes cellulose materials by one of the methods mentioned above, in fast yellowish-orange shades.

Example 92

3,5-dichloro-1,2-isothiazole-4-carboxylic acid chloride, 21.6 parts, is added to a neutral solution in 500 parts of water of 60 parts of the trisodium salt of the aminoazo dyestuff obtained by coupling diazotized 2-amino-naphthalene-2,6,8-trisulphonic acid with 3-acetylamino-aniline in an acetic acid medium, and the mixture is stirred at 45° C. for 6 hours, a pH of about 6 being maintained by the continuous addition of a sodium hydroxide solution. The partially precipitated acylation product is completely separated at a pH of 6.5 by the addition of 100 parts of sodium chloride, and filtered off. For purification, the dyestuff thus obtained can be redissolved in 2500 parts of water at 60° C., clarified and separated again by salting out the warm filtrate with 350 parts of sodium chloride. The dyestuff has the formula

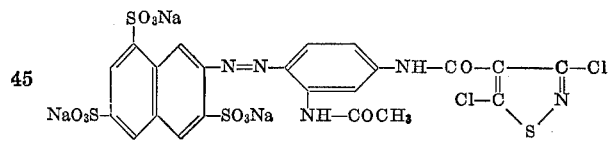

and after filtering off, drying at 45° C. and grinding, it is a yellow powder which readily dissolves in water, with a yellow color and dyes cellulose fibers by one of the dyeing methods mentioned above, in the presence of acid-binding agents, in very fast reddish-yellow shades. Fast yellow shades are also obtained on wool and polyamide fibers.

Similar dyestuffs are obtained by proceeding as described above, but using, instead of 60 parts of 4'-amino-2'-acetylamino-phenyl-(1')-azo-naphthalene - (2) - 3,6,8-trisulphonic acid sodium salt, corresponding quantities of the aminoazo dyestuff obtained from the amino compounds given in column 2 and the coupling components given in column 3 in the usual manner by diazotizing and coupling in an acetic acid medium, and acylating with 3,5-dichloro-1,2-isothiazole-4-carboxylic acid chloride.

| Example Number | Diazo component | Coupling component | Shade on cotton |
|---|---|---|---|
| 93 | 2-aminonaphthalene-1,5-disulphonic acid | 1-amino-3-methyl-6-methoxybenzene | Strongly reddish-yellow. |
| 94 | do | 1-amino-3-methylbenzene | Yellow. |
| 95 | do | 1-aminonaphthalene-6-sulphonic acid | Reddish-yellow. |
| 96 | do | 1-amino-3-acetylaminobenzene | Yellow. |
| 97 | do | 3-aminophenyl urea | Do. |
| 98 | do | 1-amino-3-hydroxyacetylaminobenzene | Do. |
| 99 | 2-aminonaphthalene-5,7-disulphonic acid | 1-amino-3-methyl-6-methoxybenzene | Strongly reddish-yellow. |
| 100 | do | 1-aminonaphthalene-7-sulphonic acid | Reddish-yellow. |
| 101 | do | 1-amino-3-acetylaminobenzene | Do. |
| 102 | do | 3-aminophenyl urea | Do. |
| 103 | do | 1-amino-3-hydroxyacetylaminobenzene | Do. |

| Example Number | Diazo component | Coupling component | Shade on cotton |
|---|---|---|---|
| 104 | 1-aminonaphthalene-3,7-disulphonic acid | 1-amino-3-methyl-6-methoxybenzene | Strongly reddish-yellow. |
| 105 | do | 1-amino-3-methylbenzene | Reddish-yellow. |
| 106 | do | 1-aminonaphthalene-6-sulphonic acid | Do. |
| 107 | 2-aminonaphthalene-3,6-disulphonic acid | 1-amino-3-methylbenzene | Do. |
| 108 | do | 1-amino-3-methyl-6-methoxybenzene | Strongly reddish-yellow. |
| 109 | do | 1-amino-3-acetylaminobenzene | Reddish-yellow. |
| 110 | do | 3-aminophenyl urea | Do. |
| 111 | do | 1-amino-3-hydroxy-acetylaminobenzene | Do. |
| 112 | do | 1-aminonaphthalene-6-sulphonic acid | Do. |
| 113 | 2-aminonaphthalene-6,8-disulphonic acid | 1-amino-3-acetylaminobenzene | Do. |
| 114 | do | 1-amino-2-methoxy-naphthalene-6-sulphonic acid | Strongly reddish-yellow. |
| 115 | do | 1-aminonaphthalene-6-sulphonic acid | Reddish-yellow. |
| 116 | 2-aminonaphthalene-4,8-disulphonic acid | 1-aminonaphthalene-6-sulphonic acid | Yellow. |
| 117 | do | 1-aminonaphthalene-7-sulphonic acid | Do. |
| 118 | do | 1-amino-2-methoxy-naphthalene-6-sulphonic acid | Strongly reddish-yellow. |
| 119 | do | 1-methylamino-3-methylbenzene | Yellow. |
| 120 | do | 1-ethylamino-3-methylbenzene | Do. |
| 121 | do | N-methylaniline | Do. |
| 122 | do | N-ethylaniline | Do. |
| 123 | do | N-(β-hydroxyethyl)-aniline | Do. |
| 124 | do | N-butylaniline | Do. |
| 125 | 2-aminonaphthalene-3,6,8-trisulphonic acid | Aniline | Reddish-yellow. |
| 126 | do | 1-amino-3-methylbenzene | Do. |
| 127 | do | 3-aminophenyl urea | Do. |
| 128 | do | 1-amino-3-hydroxyacetylaminobenzene | Do. |
| 129 | do | 1-amino-3-acetylamino-6-methoxybenzene | Yellowish-orange. |
| 130 | do | 1-amino-3-acetylamino-6-methylbenzene | Reddish-yellow. |
| 131 | do | 1-amino-3-methanesulphonyl-aminobenzene | Do. |
| 132 | do | 2,5-dimethoxyaniline | Yellowish-orange. |
| 133 | do | 3-methyl-6-methoxyaniline | Do. |
| 134 | do | N-methylaniline | Reddish-yellow. |
| 135 | do | N-ethylaniline | Do. |
| 136 | do | N-butylaniline | Do. |
| 137 | do | N-(β-hydroxyethyl)-aniline | Do. |
| 138 | do | 3-(N-ethylamino)-toluene | Do. |
| 139 | do | 2-aminotoluene | Do. |
| 140 | do | 1-amino-2,5-dimethylbenzene | Strongly reddish-yellow. |
| 141 | do | 1-amino-2-methoxybenzene | Do. |
| 142 | do | 1-amino-3-methoxybenzene | Reddish-yellow. |
| 143 | do | 1-ethylamino-3-methoxybenzene | Do. |
| 144 | do | 1-aminonaphthalene-6-sulphonic acid | Do. |
| 145 | do | 1-aminonapththalene-7-sulphonic acid | Do. |
| 146 | 2-aminonaphthalene-4,6,8-trisulphonic acid | 1-amino-3-methylbenzene | Do. |
| 147 | do | 1-amino-3-acetylaminobenzene | Do. |
| 148 | 1-aminonaphthalene-2,4,7-trisulphonic acid | 1-amino-3-methylbenzene | Yellow. |
| 149 | do | 1-aminonaphthalene-6-sulphonic acid | Do. |
| 150 | 4-nitro-4'-aminostilbene-2,2'-disulphonic acid | 1-amino-3-acetylaminobenzene | Reddish-yellow. |
| 151 | do | 3-aminophenyl urea | Do. |
| 152 | do | 1-amino-3-hydroxyacetylaminobenzene | Do. |
| 153 | do | N-methylaniline | Do. |
| 154 | do | N-ethylaniline | Do. |
| 155 | do | N-butylaniline | Do. |
| 156 | do | N-(β-hydroxyethyl)-aniline | Do. |
| 157 | do | 1-(N-ethylamino)-3-methylbenzene | Do. |
| 158 | Aniline-2,5-disulphonic acid | 1-aminonaphthalene-6-sulphonic acid | Do. |
| 159 | do | 1-aminonaphthalene-7-sulphonic acid | Do. |
| 160 | do | 1-amino-3-methylbenzene | Yellow. |
| 161 | do | 1-amino-3-acetylaminobenzene | Do. |
| 162 | do | 1-amino-2-methoxy-5-methylbenzene | Reddish-yellow. |
| 163 | do | 1-amino-2,5-dimethoxy benzene | Do. |
| 164 | Aniline-2,4-disulphonic acid | 1-amino-2-methoxy-5-methylbenzene | Do. |

Example 165

In 700 parts of water are dissolved neutral 65 parts of the dyestuff of the formula

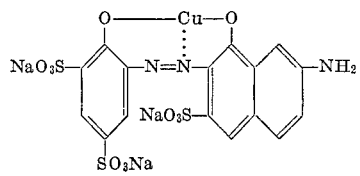

prepared by coupling diazotized 1-hydroxy-2-aminobenzene-4,6-disulphonic acid with 2-amino-8-hydroxynaphthalene-6-sulphonic acid and coppering the resultant azo dyestuff. 21.6 parts of 3,5-dichloro-1,2-isothiazole-4-carboxylic acid chloride are added and the mixture is stirred at 40–45° C., while continuously neutralizing the liberated hydrochloric acid to a pH of 5–6 with a sodium carbonate solution, until free amino groups can no longer be detected. The resultant reactive dyestuff of the formula

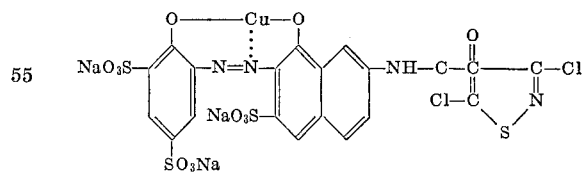

is salted out, filtered off, washed and dried at 40–50° C. The dyestuff dyes cellulose materials in very fast ruby shades by one of the methods described above.

Dyestuffs of similar properties are obtained in a manner analogous to the method described above from the copper complexes of the azo dyestuffs prepared from the diazo and azo components listed in the following table.

| Example Number | Diazo component | Coupling component | Shade on cotton |
|---|---|---|---|
| 166 | 1-hydroxy-2-aminobenzene-4-sulphonic acid | 2-methylamino-5-hydroxy-naphthalene-7-sulphonic acid | Ruby. |
| 167 | do | 2-ethylamino-5-hydroxynaphthalene-7-sulphonic acid | Do. |
| 168 | do | 2-(β-hydroxyethylamino)-5-hydroxynaphthalene-7-sulphonic acid. | Do. |
| 169 | do | 2-amino-8-hydroxynaphthalene-3,6-disulphonic acid | Do. |
| 170 | 1-hydroxy-2-aminobenzene-4,6-disulphonic acid | 2-amino-8-hydroxynaphthalene-1,7-disulphonic acid | Do. |
| 171 | do | 2-amino-8-hydroxynaphthalene-3,6-disulphonic acid | Do. |
| 172 | do | 2-methylamino-5-hydroxynaphthalene-7-sulphonic acid | Do. |
| 173 | do | 2-ethylamino-5-hydroxynaphthalene-7-sulphonic acid | Do. |
| 174 | do | 2-(β-hydroxyethylamino)-5-hydroxynaphthalene-7-sulphonic acid. | Do. |

| Example Number | Diazo component | Coupling component | Shade on cotton |
|---|---|---|---|
| 175 | do | 1-amino-8-hydroxynaphthalene-3,6-disulphonic acid | Violet. |
| 176 | do | 1-amino-8-hydroxynaphthalene-4,6-disulphonic acid | Do. |
| 177 | 1-hydroxy-2-aminobenzene-5-sulphonic acid | 1-amino-8-hydroxynaphthalene-3,6-disulphonic acid | Do. |
| 178 | do | 1-amino-8-hydroxynapthalene-4,6-disulphonic acid | Do. |
| 179 | 1-hydroxy-2-amino-4-acetylaminobenzene-6-sulphonic acid | 1-amino-8-hydroxynaphthalene-3,6-disulphonic acid | Bluish-violet. |
| 180 | do | 1-ethoxy-8-hydroxynaphthalene-3,6-disulphonic acid | Do. |

(4-positioned acetylamino group subsequently saponified)

| 181 | 1-hydroxy-2-amino-4-acetylaminobenzene-6-sulphonic acid | 1-amino-8-hydroxynaphthalene-2,4-disulphonic acid | Blue. |
| 182 | do | 1-amino-8-hydroxynaphthalene-2,4,6-trisulphonic acid | Do. |
| 183 | 1-hydroxy-2-amino-6-acetylaminobenzene-4-sulphonic acid | 1-amino-8-hydroxynaphthalene-2,4-disulphonic acid | Do. |

(6-positioned acetylamino group saponified)

| 184 | 1-amino-2-hydroxy-6-nitronaphthalene-4-sulphonic acid | 1-amino-8-hydroxynaphthalene-2,4-disulphonic acid | Do. |

(6-positioned nitro group subsequently reduced to —NH$_2$)

| 185 | 1-amino-2-hydroxy-6-nitronaphthalene-4-sulphonic acid | 1-amino-8-hydroxynaphthalene-2,4,6-trisulphonic acid | Do. |

(6-positioned nitro group subsequently reduced to —NH$_2$)

| 186 | 1-hydroxy-2-amino-6-acetylaminobenzene-4-sulphonic acid | 1-amino-8-hydroxynaphthalene-2,4,6-trisulphonic acid | Do. |

(6-positioned acetylamino group saponified)

Example 187

Following the procedure of Example 22, except that the diazotized intermediate product containing reactive groups is coupled in a soda-alkaline medium with 40 parts of the sodium salt of 1-acetylamino-8-hydroxy-naphthalene-3,6-disulphonic acid, in place of 47 parts of the sodium salt of 1-benzoylamino-8-hydroxy-naphthalene-3,6-disulphonic acid, and the resultant dyestuff of the formula

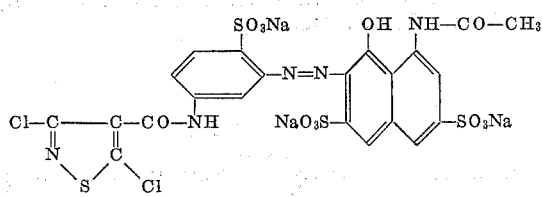

is isolated in the manner described in Example 22. The water-soluble dyestuff dyes cellulose materials by the pad-steaming or pad-thermofixing method (at 140° C.) in white-dischargeable bluish-red shades which are fast to wet processing, rubbing, and light.

Example 188

A solution of 19.5 parts of the sodium salt of 1-aminobenzene-4-sulphonic acid and 6.9 parts of sodium nitrite in 200 parts of water is allowed to run into a mixture of 100 parts of ice and 28 parts by volume of concentrated hydrochloric acid; the mixture is then stirred at 0–10° C. for 30 minutes and the excess nitrous acid is subsequently removed. To the diazo suspension thus obtained there is added at 0–10° C. the cooled and thus partially recrystallized solution of 26.2 parts of the potassium salt of 1-aminonaphthalene-8-sulphonic acid in 250 parts of hot water and the strongly acidic coupling mixture is neutralized at 10–20° C. to a pH of 4 by carefully adding a sodium hydroxide solution. The coupling is rapidly completed; the aminoazo dyestuff formed is completely salted out with 100 parts of sodium chloride, filtered off with suction, washed and redissolved in 400 parts of water at 50° C. at a pH of 6–7. The aqueous solution is mixed with 21.6 parts of finely powdered 3,5-dichloro-1,2-isothiazole-4-carboxylic acid chloride and stirred at 45–50° C. for one hour, while continuously neutralizing the liberated hydrochloric acid to a pH of 5 with a sodium carbonate solution. When no more aminoazo dyestuff is indicated, the partially precipitated reactive dyestuff of the formula

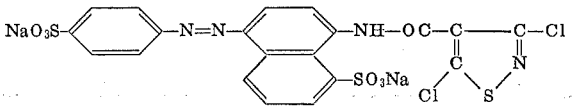

is salted out with 40 parts of sodium chloride, filtered off and redissolved in 800 parts of warm water for purification. After clarifying the solution, the pure dyestuff is separated from the filtrate by the addition of 80–100 parts of sodium chloride. After filtering off, drying at 45° C. and grinding, a yellow powder is obtained which readily dissolves in water, with a yellow color, and dyes cellulose fibers by one of the dyeing methods mentioned above in the presence of acid-binding agents in yellow shades of very good fastness to wet processing, light and chlorine. Fast yellow shades are also obtained on wool and polyamide fibers.

By proceeding as described above, but coupling, instead of 19.5 parts of the sodium salt of 1-aminobenzene-4-sulphonic acid, equivalent amounts of the diazo components listed in the following table with 1-aminonaphthalene-8-sulphonic acid, followed by acylation with 3,5-dichloro-1,2-isothiazole-4-carboxylic acid chloride, valuable yellow to brown reactive dyestuffs are also obtained.

| Diazo component | Shade on cellulose fibers |
|---|---|
| 1-aminobenzene-2,5-disulphonic acid | Reddish-yellow. |
| 2-amino-naphthalene-4,8-disulphonic acid | Strongly reddish-yellow. |
| 2-amino-naphthalene-5,7-disulphonic acid | Do. |
| 2-amino-naphthalene-6,8-disulphonic acid | Do. |
| 2-amino-naphthalene-3,6,8-trisulphonic acid | Do. |
| 2-amino-naphthalene-4,6,8-trisulphonic acid | Do. |
| 4-amino-azobenzene-3,4'-disulphonic acid | Yellowish-brown. |
| 4-amino-2-acetylamino-azobenzene-2',5'-disulphonic acid | Orange-brown. |
| (structure shown) | Reddish-brown. |

(1-aminobenzene-2,5-disulphonic acid coupled with 1-amino-naphthalene-6-sulphonic acid in an acidic medium)

| Diazo component | Shade on cellulose fibers |
|---|---|
| (structure: 1-aminobenzene-2,5-disulphonic acid coupled with a technical mixture of 1-aminonaphthalene-6- and -7-sulphonic acid in an acidic medium) | Do. |
| (structure: 1-amino-naphthalene-2,5,7-trisulphonic acid coupled with 1-amino-naphthalene-6-sulphonic acid in an acidic medium) | Violettish-brown. |
| (structure: 1-amino-naphthalene-2,5,7-trisulphonic acid coupled with 1-amino-2-methoxy-5-methylbenzene in an acidic medium) | Reddish-brown. |

Example 189

When a cellulose fabric is printed with a printing paste which contains, per kilogram, 30 g. of the dyestuff described in Example 12, 100 g. of urea, 300 g. of water, 500 g. of alginate thickening (60 g. of sodium alginate per kilogram of thickening), 10 g. of sodium carbonate and 10 g. of the sodium salt of 3-nitrobenzene-sulphonic acid and which was made up with water to 1 kg., subsequently subjected to intermediate drying and then steamed in a suitable steaming apparatus at 103–115° C. for 30 seconds, rinsed and boiled with soap, an intense bluish-red print of good fastness to wet processing, rubbing, and light is obtained.

Example 190

A mixture of the solutions of 65.5 parts each of the 2:1 chromium complex and the 2:1 cobalt complex of the dyestuff of the formula

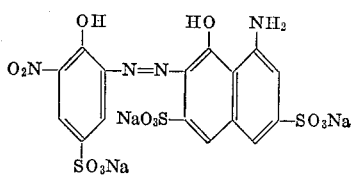

each time, in 400 parts of water, is stirred with 45 parts of finely powdered 3,5 - dichloro - 1,2 - isothiazole-4-carboxylic acid chloride at 45° C. for about 10 hours, while maintaining a pH of 4.5–5.5. When no more aminoazo dyestuff can be detected by chromatography (Co-complex: blue; Cr-complex: blue-green), the resultant mixture of the two reactive dyestuffs is salted out with potassium chloride, filtered off and dried.

The dyestuff yields on cellulose materials by the padding processes or by printing in the presence of acid-binding agents intense black shades of very good fastness to wet processing and light.

By proceeding in an analogous manner, but using a mixture of the 2:1 chromium-complex and the 2:1 cobalt-complex of the following aminoazo dyestuffs, valuable black dyestuffs are likewise obtained.

| Diazo component | Coupling component | Coupling pH |
|---|---|---|
| 1-hydroxy-2-amino-4-nitro-benzene. | 1-hydroxy-8-amino naphthalene-3,6-disulphonic acid. | 9 |
| 1-hydroxy-2-amino-4-nitro-naphthalene-7-sulphonic acid. | ----do---- | 9 |

Example 191

3,5-dichloro-1,2-isothiazole-4-carboxylic acid chloride, 21.6 parts, is added to a neutral solution in 300 parts of water, of 53.15 parts of the disodium salt of the aminoazo dyestuff obtained by coupling diazotized 1-amino-4-nitro-benzene-2-sulphonic acid with 1-(2'-chloro-5'-sulphophenyl)-3-methyl-pyrazolone-(5) and subsequent reduction of the nitro group with sodium sulphide, and the mixture is stirred at 45–50° C. for two hours, while continuously neutralizing the liberated hydrochloric acid to a pH of 4–6 with a sodium carbonate solution. The separated dyestuff of the formula

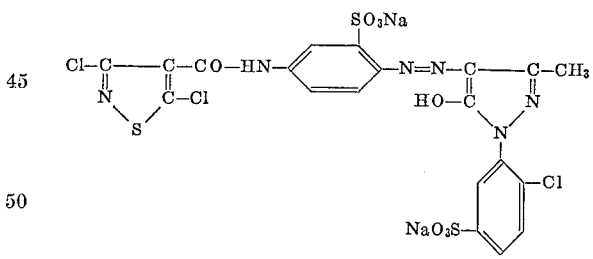

is filtered off, dissolved warm at a pH of 6–7 in 3000 parts of water and reprecipitated from the filtered solution by the addition of sodium chloride. After filtering off, drying and powdering, a yellow powder is obtained, which is readily soluble in water and dyes cellulose materials from a long bath at 40° C. or by the cold-pad-batch process with the use of sodium carbonate as acid-binding agent, in clear yellow shades fast to washing, rubbing, and light.

By proceeding as described above, but using, instead of the aminoazo dyestuff there employed, equivalent amounts of the aminoazo dyestuffs synthesized from the components listed in the following table, valuable new reactive dyestuffs are likewise obtained.

In the table, the term "saponified" means that an acylamino group contained in the aminoazo dyestuff was subsequently saponified, while the term "reduced" means that a nitro group contained in the diazo component is reduced, after coupling, to the amino group, whereby the desired aminoazo dyestuff is formed.

| Ex. No. | Diazo component | Azo component | pH of coupling medium | Shade on cellulose |
|---|---|---|---|---|
| 192 | 1-amino-4-nitrobenzene-2-sulphonic acid | 1-(4'-sulphophenyl)-3-methyl-pyrazolone-(5) | 5-6 | Yellow. |
| | (4-positioned nitro group subsequently reduced) | | | |
| 193 | 1-amino-4-nitrobenzene-2-sulphonic acid | 1-(4'-sulphophenyl)-3-carboxy-pyrazolone-(5) | 5-6 | Reddish-yellow. |
| 194 | do | 1-(3'-sulphophenyl)-3-methyl-5-amino-pyrazole | 6-7 | Do. |
| 195 | 1-amino-3-acetylamino-benzene-6-sulphonic acid | do | 6-7 | Do. |
| | (3-positioned acetylamino group subsequently saponified) | | | |
| 196 | 1-amino-3-acetylamino-benzene-6-sulphonic acid | 1-(β-hydroxyethyl)-3-methyl-pyrazolone-(5) | 5-6 | Do. |
| 197 | 2 mol 1-amino-3-acetylamino-benzene-6-sulphonic acid (saponified). | 1 mol bis-pyrazolone from 4,4'-bis-hydrazino-dibenzyl-2.2'-bisulphonic acid and acetoacetic ethyl ester. | 5-6 | Do. |
| 198 | 1 mol 1-amino-3-acetylamino-benzene-6-sulphonic acid (saponified). | 1-(4'-sulphophenyl)-3-carboxy-pyrazolone-(5) | 5-6 | Do. |
| 199 | 1-amino-5-acetylamino-naphthalene-3,7-disulphonic acid (saponified). | do | 5-6 | Do. |
| 200 | 1-amino-2-methyl-benzene-4,6-disulphonic acid | 2-acetylamino-5-naphthol-7-sulphonic acid (saponified) | 7-8 | Orange. |
| 201 | do | 2-acetylamino-8-naphthol-6-sulphonic acid (saponified) | 7-8 | Red. |
| 202 | do | 1-chloro-2-acetylamino-5-naphthol-7-sulphonic acid (saponified). | 7-8 | Orange. |
| 203 | 1 aminobenzene-2-sulphonic acid | 1-acetylamino-8-hydroxy-naphthalene-4,6-disulphonic acid (saponified). | 7-8 | Red. |
| 204 | 2-aminonaphthalene-3,6-disulphonic acid | do | 7-8 | Bluish-red. |
| 205 | 2-aminonaphthalene-3,7-disulphonic acid | do | 7-8 | Do. |
| 206 | 2-aminonaphthalene-4,8-disulphonic acid | do | 7-8 | Do. |
| 207 | 2-aminonaphthalene-3,6-disulphonic acid | 1-acetylamino-8-hydroxy-naphthalene-3,6-disulphonic acid (saponified). | 7-8 | Do. |
| 208 | 2-aminonaphthalene-4,8-disulphonic acid | do | 7-8 | Do. |
| 209 | 1-amino-4-methoxybenzene-2-sulphonic acid | 2-(N-acetyl-N-methylamino)-5-hydroxynaphthalene-7-sulphonic acid (saponified). | 7-8 | Yellowish-red. |
| 210 | do | 2-(N-acetyl-N-methylamino)-8-hydroxynaphthalene-6-sulphonic acid (saponified). | 7-8 | Red. |
| 211 | 1-aminobenzene-2-sulphonic acid | 2-(N-acetyl-N-methylamino)-8-hydroxynaphthalene-6-sulphonic acid (saponified). | 7-8 | Red. |
| 212 | 1-aminobenzene-3-sulphonic acid | do | 7-8 | Red. |
| 213 | 1-aminobenzene-4-sulphonic acid | do | 7-8 | Red. |
| 214 | 1-amino-4-methylbenzene-2-sulphonic acid | do | 7-8 | Red. |
| 215 | 1-amino-2,4-dimethylbenzene-6-sulphonic acid | do | 7-8 | Red. |
| 216 | do | 2-acetyl-8-hydroxy-naphthalene-6-sulphonic acid (saponified). | 7-8 | Red. |
| 217 | do | 2-acetylamino-8-hydroxynaphthalene-3,6-disulphonic acid (saponified). | 7-8 | Red. |
| 218 | 4-aminoazobenzene-3,4'-disulphonic acid | 1-amino-3-acetylaminobenzene | 5-6 | Yellow-brown. |
| 219 | do | 1-amino-3-hybroxyacetylamino-benzene | 5-6 | Do. |
| 220 | do | 1-amino-naphthalene-6-sulphonic acid | 5-6 | Do. |
| 221 | do | 1-amino-naphthalene-7-sulphonic acid | 5-6 | Do. |
| 222 | do | 1-amino-2-(4'-amino-2'-sulphophenyl-(1')-azo)-8-hydroxynaphthalene-3,6-disulphonic acid. | 8 | Black. |

Example 223

In 1000 parts of water are dissolved 52.4 parts of the disodium salt of 4-([4''-aminophenyl]-amino)-2'-nitro-diphenyl-amino-3,4'-disulphonic acid and stirred with 21.6 parts of 3,5-dichloro-1,2-isothiazole-4-carboxylic acid chloride at 45–50° C. for 5 hours. The liberated hydrochloric acid is continuously neutralized with sodium carbonate to a pH of 4–6. The resultant reactive nitro dyestuff of the formula

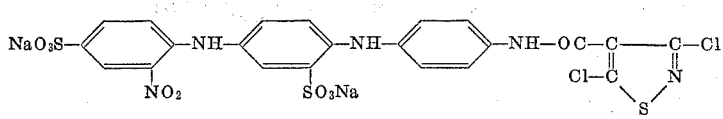

is salted out, filtered off, washed and dried. The dyestuff dyes cellulose fibers from a long bath or by one of the customary padding processes in the presence of sodium carbonate as acid-binding agent in deep violet-brown shades fast to wet processing and rubbing.

Example 224

A neutral solution of 54.7 parts of the disodium salt of 1 - amino-4-(2'-methyl-3'-aminophenyl)-amino-anthraquinone - 2,5-disulphonic acid in 1000 parts of water is stirred with 21.6 parts of 3,5-dichloro-1,2-isothiazole-4-carboxylic acid chloride at 30° C. for 4 hours. The liberated hydrochloric acid is continuously neutralized to a pH value of 6.5–7 with a sodium carbonate solution. When the reaction is completed, the resultant reactive dyestuff of the formula

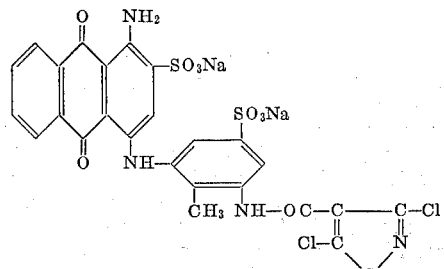

is salted out, filtered off, washed and dried at 40–50° C. It dyes cellulose materials in clear blue shades of very good fastness to wet processing, rubbing, and light.

Blue dyestuffs of similar properties are obtained when the procedure described above is followed, but instead of the water-soluble amino-anthraquinone derivative there mentioned, equivalent amounts of the amino-anthraquinone-sulphonic acid derivatives listed below are acylated with 3,5-dichloro-1,2-isothiazole-4-carboxylic acid chloride:

| Example Number | Water-soluble amino-anthraquinone derivative |
|---|---|
| 225 | 1-amino-4-(3'-aminophenyl)-amino-anthraquinone-2,5'-disulphonic acid. |
| 226 | 1-amino-4-(2'-chloro-3'-minophenyl)-amino-anthraquinone-2,5'-disulphonic acid. |
| 227 | 1-amino-4-(2'-methyl-3'-methylaminophenyl)-amino-anthraquinone-2,5'-disulphonic acid. |
| 228 | 1-amino-4-(4'-aminophenyl)-amino-anthraquinone-2,6,3'-trisulphonic acid. |
| 229 | 1-amino-4-(3'-aminophenyl)-amino-anthraquinone-2,6,4'-trisulphonic acid. |
| 230 | 1-amino-4-(4'-aminophenyl)-amino-anthraquinone-2,5,3'-trisulphonic acid. |
| 231 | 1-amino-4-(3'-aminophenyl)-amino-anthraquinone-2,5,4'-trisulphonic acid. |
| 232 | Mixture of 1-amino-4-(3'-aminophenyl)-aminoanthraquinone-2,4'5 and -2,4'-8-trisulphonic acid furthermore, the derivatives subsequently sulphonated with 5% oleum at 20–30° C. |
| 233 | 1-amino-4-[4'-(4''-aminobenzyl)-phenyl]-aminoanthraquinone-2-sulphonic acid. |
| 234 | 1-amino-4-(4'-methylaminophenyl)-amino-anthraquinone-2-sulphonic acid. |
| 235 | 1-amino-4-(3'-methylaminophenyl)-amino-anthraquinone-2-sulphonic acid. |
| 236 | 1-amino-4-(2'-methylaminophenyl)-amino-anthraquinone-2-sulphonic acid. |
| 237 | 1-amino-4-(7'-amino-naphthyl-[2'])-amino-anthraquinone-2-sulphonic acid. |
| 238 | The condensation product of 1 mol of cyanuric chloride with 1 mol of 1,4-diamino-anthraquinone-2-sulphonic acid, 1 mol of aniline-2,5-disulphonic acid, and 1 mol of ethylene diamine (one-sided) yields, after acylation with 3,5-dichloro-1,2-isothiazole-4-carboxylic acid chloride, a violet reactive dyestuff. |

Example 239

A solution of 107 g. of a mixture of equal molar portions of copper-phthalocyanine-trisulphonic acid-(3,3',3'')-mono-(m-amino-p-sulphophenyl)-amide and copper-phthalocyanine-trisulphonic acid-3,3',3'')-di-(m-amino-p-sulphophenyl)-amide is adjusted to 1.3 liters and a pH of 6; 32.5 g. of 3,5-dichloro-1,2-isothiazole-4-carboxylic acid chloride are introduced at 20–25° C. While stirring, the temperature is raised by 5–10° C. per hour and finally kept at 45–50° C. for several hours. At the same time, a pH of about 6.1–6.9 is maintained by the dropwise addition of 3 N NaOH, until on average each dyestuff molecule is provided with at least one dichloro-isothiazole-carboxylic acid amide radical; this can easily be ascertained by the consumption of sodium hydroxide solution, on the one hand, and by a determination of amino groups, on the other hand. The 3,5-dichloro-1,2-isothiazole-4-carboxylic acid chloride can also be introduced in the form of a solution in acetone. For working up, the dyestuff solution may also be heated at the stated pH to 80° C. or more, without reducing the capability of the dyestuff to react with cellulose. Separation of unreacted 3,5-dichloro-1,2-isothiazole-4-carboxylic acid and of the saponification product formed therefrom is carried out by filtration or in a separator. The reaction product is precipitated by introducing 150 g. of sodium chloride per liter of dyestuff solution. The product is filtered off with suction and dried at about 50° C. in a vacuum or at normal pressure. 195–200 grams of crude dyestuff are obtained, which still contains about 30% of sodium chloride. The common salt can be removed to a great extent by stirring the crude dyestuff with 250 ml. of water and again filtering off with suction.

The dyestuff dyes cellulose materials by the pad-thermofixing process at 140° C. and the pad-steaming process in turquoise shades fast to wet processing, rubbing, and light.

The dyestuff mixture used as starting material can be obtained by a method known as such, for example, by adding 3 mol of 2,4-diaminobenzene-sulphonic acid at 0–20° C. and at a pH of about 6.5 to an aqueous suspension of a copper-phthalocyanine-trisulphonic acid chloride which is free of sulphonic acid groups, and simultaneously catalyzing the saponification with 3 mol of pyridine, whereby the above-mentioned mixture of Pc-sulphonamides is formed.

A similar product is obtained by using as starting material a mixture which contains the stated components in a molar ratio of 4:1. This mixture is obtained from the same copper-phthalocyanine-trisulphonic acid chloride and 2 mol of 2,4-diaminobenzene-sulphonic acid by the same process.

Instead of the stated starting materials there may also be used those which in place of copper contain nickel as the central atom or which were prepared from copper-phthalocyanine-trisulphonic acid chloride-(4,4',4'') or from phthalocyanine-tetrasulphonic acid chlorides-(3,4',4'',4''') or -(4,4',4'',4''') or with the use of other arylene-diamine-sulphonic acids, such as toluylene-diamine-(2,4)-sulphonic acid - (5), 4,4' - diamino - dibenzyl-disulphonic acid-(2,2'), naphthylene-diamine-(1,5)-disulphonic acid-(3,7). Products of this type and their production have frequently been described in the patent literature. Their reaction with 3,5 - dichloro - 1,2 - isothiazole-4-carboxylic acid chloride can always be carried out in the same way.

This applies also to the reaction of 3,5-dichloro-1,2-isothiazole-4-carboxylic acid chloride with the copper- and nickel-phthalocyanine intermediates which lead to green reactive dyestuffs and are obtainable, for example, by polysulphochlorination of tetra - (3,3',3'',3''') - (p - tolyl-mercapto)-copper-phthalocyanine with chlorosulphonic acid, condensation of 1 to 2 sulphochloride groups per molecule with 1,3-phenylene-diamine-4-sulphonic acid or 1,4-phenylene-diamine-3-sulphonic acid, and saponification of the remaining sulpho-chloride groups; also the homogeneous or mixed amino group- and sulpho group-containing arylation and alkylation products of tri- and tetramercapto-copper- (-nickel)-phthalocyanine can be converted into valuable green reactive dyestuffs in an analogous manner by acylation of their amino group with 3,5-dichloro-1,2-isothiazole-4-carboxylic acid.

Example 240

By proceeding according to the instructions of Example 12, but coupling the dyestuff intermediate obtained in the presence of 12 parts of sodium carbonate at a final pH of 7, with the diazo compound from 20.8 parts of 3-chloro-aniline-6-sulphonic acid, in place of the diazo compound from 17.5 parts of 2-aminobenzene-sulphonic acid, a reactive dyestuff of the formula

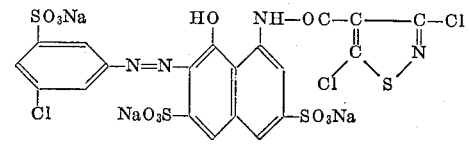

is obtained, with which cellulose materials can be dyed or printed by one of the padding or printing processes customary for reactive dyestuffs with the use of sodium carbonate as acid-binding agent, in brilliant red shades fast to wet processing.

In an analogous manner there are obtained from the coupling components listed in the following table by acylation of their amino group with 3,5-dichloro-1,2-isothiazole-4-carboxylic acid·chloride and coupling of the resultant dyestuff intermediates with the stated diazo components, valuable reactive dyestuffs with which cellulose materials can be dyed or printed, preferably in the presence of sodium carbonate, in the shades as indicated.

| Ex. No. | Diazo component | Coupling component | Coupling pH | Shade |
|---|---|---|---|---|
| 241 | 1-amino-4-methoxybenzene-6-sulphonic acid | 1-amino-8-hydroxynaphthalene-3,6-disulphonic acid | 7–8 | Violet. |
| 242 | do | 1-amino-8-hydroxynaphthalene-4,6-disulphonic acid | 7–8 | Reddish-Violet. |
| 243 | do | 2-amino-5-hydroxynaphthalene-1,7-disulphonic acid | 7 | Scarlet. |
| 244 | 1-amino-5-chlorobenzene-2-sulphonic acid | do | 7 | Orange. |
| 245 | 1-aminobenzene-3-sulphonic acid | do | 7 | Do. |
| 246 | 1-aminobenzene-4-sulphonic acid | do | 7 | Do. |
| 247 | do | 2-amino-8-hydroxynaphthalene-3,6-disulphonic acid | 7–8 | Scarlet. |
| 248 | 4-aminobenzoic acid-(β-sulpho-ethyl)-amide | 1-amino-8-hydroxynaphthalene-3,6-disulphonic acid | 7–8 | Red. |
| 249 | 1-amino-4-sulphoacetylamino-benzene-6-sulphonic acid | do | 7–8 | Violet. |
| 250 | 1-amino-3-sulphoacetylamino-benzene-6-sulphonic acid | 2-amino-5-hydroxynapthalene-1,7-disulphonic acid | 7 | Orange. |
| 251 | 1-amino-4-sulphoacetylamino-benzene | do | 7 | Scarlet. |
| 252 | 1-aminobenzene-2,4-disulphonic acid | 1-(2'-methyl-3'-amino-5'-sulphophenyl)-3-methyl-pyrazolone-(5). | 6 | Yellow. |
| 253 | 2-amino-naphthalene-4,8-disulphonic acid | do | 6 | Do. |

Example 254

By proceeding according to the instructions of Example 22, but coupling the dyestuff intermediate obtained aminoazo dyestuff synthesized from the components listed in the following table with 3,5-dichloro-1,2-isothiazole-4-carboxylic acid chloride:

| Ex. No. | Diazo component | Azo component | Shade |
|---|---|---|---|
| 256 | 1-amino-4-nitrobenzene-2-sulphonic acid (reduced) | 1-(2'-methyl-4'-sulphophenyl)-3-methyl-pyrazolone-(5) | Yellow. |
| 257 | do | 1-(2',5'-disulphophenyl)-3-methylpyrazolone-(5) | Do. |
| 258 | do | 1-(2'-methyl-4'-sulpho-6'-chlorophenyl)-3-methylpyrazolone (5) | Do. |
| 259 | do | 1-(2',5'-dichloro-4'-sulphophenyl)-3-methylpyrazolone-(5) | Do. |
| 260 | 1-amino-3-acetylaminobenzene-6-sulphonic acid (saponified) | 1-(2'-methyl-4'-sulphophenyl)-3-methylpyrazolone-(5) | Greenish-yellow. |
| 261 | do | 1-(4'-sulphophenyl)-3-methyl-pyrazolone-(5) | Do. |
| 262 | do | 1-(2'-methyl-4'-sulphophenyl)-3-carboxy-pyrazolone-(5) | Do. |
| 263 | do | 1-(2'-chloro-4'-sulphophenyl)-3-carboxy-pyrazolone-(5) | Do. | from 1,3-diaminobenzene-6-sulphonic acid and 3,5-dichloro-1,2-isothiazole-4-carboxylic acid chloride, after diazotization at 40° C. at a pH of 7.5–6.5, with a solution of 40.5 parts of the disodium salt of 2-sulphoacetyl-amino-5-hydroxynaphthalene-7-sulphonic acid, a reactive dyestuff of the formula

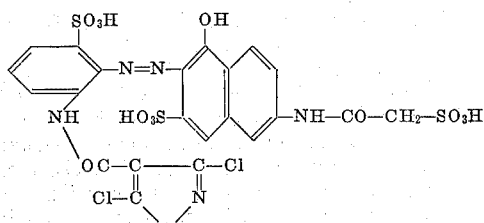

is obtained, which dyes cellulose materials by the usual methods of application with the use of sodium carbonate as acid-binding agent in fast orange shades.

Example 255

When the procedure described in Example 191 is followed, but instead of the aminoazo dyestuff there employed, 53.15 parts of the disodium salt of the aminoazo dyestuff obtained by coupling diazotized 1-amino-4-nitrobenzene-2-sulphonic acid with 1-(2'-chloro-5'-sulphophenyl)-3-methyl-pyrazolone-(5) and subsequent reduction of the nitro group with sodium sulphide, are acylated with 3,5-dichloro-1,2-isothiazole-4-carboxylic acid chloride, a valuable reactive dyestuff is likewise obtained, with which cellulose materials can be dyed or printed by the usual dyeing and printing processes in fast yellow shades.

Similar reactive dyestuffs are obtained by acylating instead of the aminoazo dyestuff mentioned above, an Example 264

In 700 parts of water are dissolved neutral 58 parts of the dyestuff having the formula

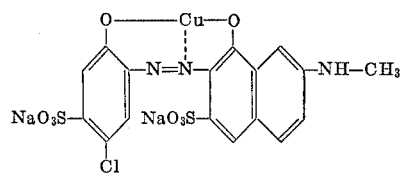

prepared by coupling diazotized 1-hydroxy-2-amino-4-chlorobenzene-5-sulphonic acid with 2-methylamino-8-hydroxynaphthalene-6-sulphonic acid and coppering the resultant azo dyestuff, and 21.6 parts of finely powdered 3,5-dichloro-1,2-isothiazole-4-carboxylic acid chloride are added and the mixture is stirred at 40–45° C., while continuously neutralizing the liberated hydrochloric acid to a pH of 5–6 with a sodium carbonate solution, until free amino groups can no longer be detected. The resultant reactive dyestuff of the formula

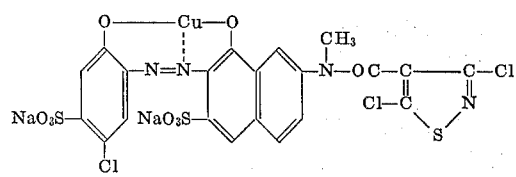

is salted out, filtered off, washed and dried at 40–50° C. The dyestuff dyes cellulose materials by one of the methods described above, in very fast violet shades.

Dyestuff of similar properties are obtained in a manner analogous to the method described above from the copper complexes, obtained by simple de-methylating or oxidizing coppering, of the mono- and diazo dyestuffs produced from the diazo and azo components listed in the following table:

| Ex. No. | Diazo component | Azo component | Coupling pH | Shade |
|---|---|---|---|---|
| 265 | 1-hydroxy-2-amino-4-chlorobenzene-5-sulphonic acid | 2-amino-8-hydroxynaphthalene-3,6-disulphonic acid | 10 | Reddish-Violet. |
| 266 | do | 1-amino-8-hydroxynaphthalene-3,6-disulphonic acid | 10 | Bluish-violet. |
| 267 | 2-amino-naphthalene-4,6,8-trisulphonic acid (coppered with oxidation). | 2-hydroxy-6-acetylaminonaphthalene-4-sulphonic acid (saponified). | 8-9 | Reddish-blue. |
| 268 | 1-amino-2-hydro-6-nitronaphthalene-4-sulphonic acid (reduced). | 1-hydroxy-8-ethoxynaphthalene-3,6-disulphonic acib | 10 | Blue. |
| 269 | 1-hydroxy-2-aminobenzene-4,6-disulphonic acid | 2-hydroxy-3-aminonaphthalene-5,7-disulphonic acid | 10 | Reb. |
| 270 | 2-amino-naphthalene-4,8-disulphonic acid (coppered with oxidation). | do | 8-9 | Blue. |
| 271 | 2-aminonaphthalene-4,6,8-trisulphonic acid (coppered with oxidation). | 2-hydroxy-3-aminonaphthalene-7-sulphonic acid | 8-9 | Do. |
| 272 | 3-methoxy-4-amino-6-methylazobenzene-2',4'-disulphonic acid (coppered with demethylation). | 2-methylamino-5-hydroxynaphthalene-7-sulphonic acid | 10 | Navy Blue. |
| 273 | do | 2-amino-8-hybroxynaphthalene-3,6-disulphonic acid | 10 | Do. |
| 274 | 3-methoxy-4-amino-6-methylazobenzene-2',4'-disulphonic acid (coppered with demethylation). | 2-amino-5-hybroxynaphthalene-1,7-disulphonic acid | 10 | Do. |
| 275 | 3-methoxy-4-amino-6-methylazobenzene-2',5'-disulphonic acid (coppered with demethylation). | 2-methylamino-5-hydroxynaphthalene-7-sulphonic acid | 10 | Do. |
| 276 | do | 2-amino-8-hydroxynaphthalene-3,6-disulphonic acid | 10 | Do. |
| 277 | do | 2-amino-5-hydroxynaphthalene-1,7-disulphonic acid | 10 | Do. |

Example 278

By proceeding according to the instructions of Example 224, but using instead of the 54.7 parts of the disodium salt of 1-amino-4-[(2'-methyl-3'-aminophenyl)-amino]-anthraquinone-2,5-disulphonic acid there mentioned, 63.5 parts of the trisodium salt of 1-amino-4-[(3'-aminophenyl)-amino]-anthraquinone - 2,4',6'- or -2,2',6'-trisulphonic acid, a reactive dyestuff is obtained which dyes cellulose fibers by one of the usual dyeing methods in clear reddish-blue shades of very good fastness to wet processing.

By using equivalent amounts of 1-amino-4-(3'-aminophenyl-amino)-anthraquinone-2,5,8-trisulphonic acid, a valuable reactive dyestuff is likewise obtained which dyes cotton in fast greyish-blue shades.

Example 279

In 300 parts of water are dissolved neutral 30.4 parts of 2-amino-8-hydroxynaphthalene - 3,6 - disulphonic acid, heated to 45–50° C., and 15.6 parts of 3,5-dichloro-1,2-isothiazole-4-carboxylic acid chloride are added. 30 parts of a 15% sodium carbonate solution are added in the course of 5 hours so that the pH value is between 4 and 6. The acylation product partially precipitates.

A freshly prepared diazonium salt solution from 13.6 parts of p-aminobenzyl-sulphonic acid is added dropwise at 0–5° C. into a suspension of the acylation product, which has been mixed with 12.5 parts of sodium carbonate. After subsequent stirring for 5 hours at ice-bath temperature, the product is salted out with sodium chloride, filtered off with suction, washed with a dilute sodium chloride solution and dried at 40° C. in a vacuum drier. The resultant dyestuff corresponds to the formula

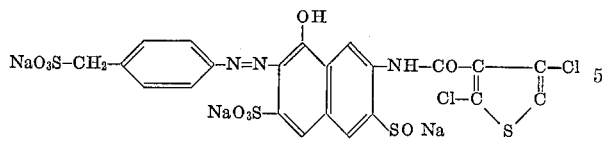

By proceeding as stated above, but acylating instead of 30.4 parts of 2-amino-8-hydroxynaphthalene-3,6-disulphonic acid, 30.4 parts of 2-amino-5-hydroxynaphthalene-1,7-disulphonic acid with 3,5-dichloro-1,2-isothiazole-4-carboxylic acid chloride and coupling the coupling component containing the reactive groups with diazotized p-aminobenzyl-sulphonic acid, a readily soluble reactive dyestuff is obtained which dyes fabrics containing cellulose fibers in brilliant reddish-orange shades.

A cotton or cellulose fabric is impregnated on the foulard at 20–25° C. with a solution containing per liter of liquor, 30 g. of the dyestuff described in paragraph 1 of the present example, 100 g. of urea and 20 g. of sodium carbonate, squeezed off to a moisture content of about 100% and the moist fabric is again rolled up. After standing at room temperature for 24 hours, the fabric is rinsed, boiled with soap in the usual manner, and dried. A brilliant scarlet dyeing of good fastness to wet processing and light is obtained.

A cotton or cellulose fabric is impregnated on the foulard at 20–25° C. with a solution containing per liter of liquor, 30 g. of the dyestuff described in paragraph 1 of the present example, 100 g. of urea and 20 g. of sodium carbonate, squeezed off to a moisture content of about 100% and steamed at 103° C. for 10 seconds. After rinsing, boiling with soap, and drying, a brilliant scarlet dyeing of good fastness to wet processing and light is likewise obtained.

A cotton fabric is impregnated with a solution at 20–25° C., which contains per liter of liquor, 20 g. of the dyestuff obtainable according to paragraph 1 of the present example and 0.5 g. of a non-ionic wetting agent (for example, a polyethoxylated oleyl alcohol) as well as 150 g. of urea and 15 g. of sodium bicarbonate. The fabric is subsequently squeezed off between two rubber rollers to a moisture content of about 100%. After an intermediate drying at 50–60° C., the fabric is heated at 140° C. for 10 minutes and the dyeing thus obtained is thoroughly rinsed with hot water and treated at the boil for 10 minutes with a solution containing per liter, 5 g. of Marseilles soap and 2 g. of sodium carbonate. After rinsing and drying, an intense scarlet dyeing of good fastness to wet processing and light is obtained.

When a cellulose fabric is printed with a printing paste which contains, per kilogram, 30 g. of the dyestuff described in paragraph 1 of the present example, 100 g. of urea, 300 g. of water, 500 g. of alginate thickening (60 g. of sodium alginate per kilogram of thickening), 10 g. of sodium carbonate and 10 g. of the sodium salt of 3-nitrobenzene-sulphonic acid and which is made up with water to 1 kg., the material is subsequently subjected to an intermediate drying and then steamed in a suitable steaming apparatus at 103–115° C. for 30 seconds, followed by rinsing and boiling with soap, an intense scarlet dyeing of good fastness properties is obtained.

100 parts of wool are introduced at 40° C. into a bath which contains, in 5000 parts of water, 1.5 parts of the dyestuff described in paragraph 1 of the present example as well as 6 parts of 30% acetic acid and 0.5 part of a polyethoxylated stearylamine derivative containing hydroxyl groups. The dyebath is brought to the boil within 30 minutes, and dyeing is then carried out at boiling temperature for one hour. After rinsing and drying, a brilliant scarlet dyeing of good fastness to washing, milling, and light is obtained.

Example 280

2-amino-1-methylbenzene-3,5-disulphonic acid (monosodium salt), 28.9 parts, is diazotized and the diazo compound is coupled with 13.7 g. of 1-amino-2-methoxy-5-methylbenzene in a weakly acidic medium. The resultant monoazo dyestuff is isolated and subsequently diazotized, or also immediately diazotized in solution without isolation, and coupled in an alkaline medium with 25.3 parts of 2 - methyl - amino-5-hydroxynaphthalene-7-sulphonic acid. The diazo dyestuffs obtained is salted out by the addition of sodium chloride, filtered off with suction, and the isolated product is metallized with about 50 parts of crystalline copper sulphate, 40 parts of diethanolamine and 50 parts of ammonia (d. 0.88) at 95–100° C. within about 5 hours. The dyestuff is isolated from the coppering solution by the addition of salt and careful acidification.

The coppered amino-diazo dyestuff is then acylated in an aqueous solution at a pH of 4–6 and at a temperature of 45° C. with 21.5 parts of 3,5-dichloro-1,2-isothiazole-4-carboxylic acid chloride, while maintaining the pH value within the stated range by the addition of sodium carbonate. When the acylation is completed, the dyestuff is isolated with sodium chloride and dried at 50° C. In the form of the free sulphonic acid, the dyestuff corresponds to the formula

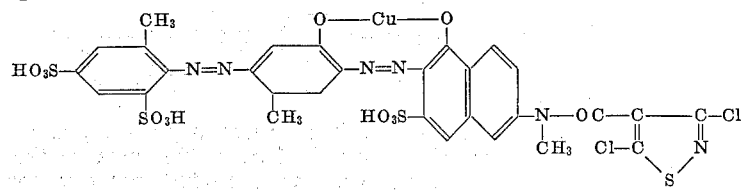

It dyes cellulose fabrics by the processes known for reactive dyestuffs in navy blue shades fast to wet processing and light.

Further dyestuffs according to the invention can be produced in a similar manner, when the above-mentioned monoazo dyestuff from 2-amino-1-methylbenzene-3,5-disulphonic acid and 1-amino-2-methoxy-5-methylbenzene is combined with the amino-naphthol-sulphonic acids given below and with 3,5-dichloro-1,2-isothiazole-4-carboxylic acid chloride in accordance with the instructions given above.

Coupling component:

2-amino-5-hydroxynaphthalene-1,7-disulphonic acid
2-amino-8-hydroxynaphthalene-3,6-disulphonic acid The resultant dyestuffs have a blue color.

Example 281

4 - ureido-2-amino-1-hydroxybenzene-5-sulphonic acid, 0.1 mol, is diazotized and coupled in a soda-alkaline medium with 0.1 mol of 1-amino-8-hydroxynaphthalene-2,4-disulphonic acid. The coupling solution is adjusted with caustic soda to a content of 2 mol/liter and then boiled under reflux for 3 hours to saponify the ureido group. After cooling, the mixture is neutralized with hydrochloric acid. The dyestuff is metallized by the addition of 25 parts of copper sulphate and 100 parts of a 2 N sodium hydroxide solution at 45° C., and a pH value of 4–6, and acylated after 30 minutes at a pH value of 4–6 and at a temperature of 45–60° C. with 0.1 mol of 3,5-dichloro-1,2-isothiazole-4-carboxylic acid chloride. The resultant dyestuff of the formula

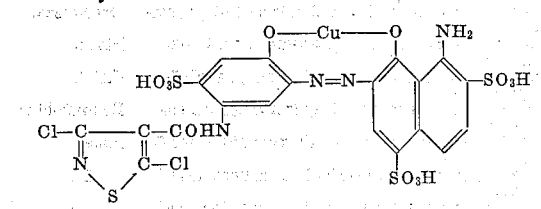

is salted out. A blue dyeing is obtained on cotton.

Example 282

A neutral paste of copper-phthalocyanine-3,3',3''-trisulphonic acid chloride prepared from 600 g. of technical 96% copper phthalocyanine is stirred with a little water, adjusted to 1 liter and reacted at a pH of 3.5–6.0 with 216 g. of N-methyl-N-(4'-amino-2'-sulphobenzyl)-amine, initially at 0–3° C., finally at 20–35° C., with the addition of 300 ml. (295 g.) of pyridine, and the pyridine is then distilled off from the resultant solution of copper-phthalocyanine-disulphonic acid-monosulphonic acid-(3'-sulpho-4'-methyl-aminomethyl-anilide) at a pH of 9.0 with steam. 280 grams of finely powdered 3,5-dichloro-1,2-isothiazole-4-carboxylic acid chloride are added in portions in the course of 4–6 hours to the solution which has been cooled to 30° C., while maintaining a pH of 7.5–9.5 by the addition of a dilute sodium hydroxide solution. At the same time the reaction mixture is diluted with water as required, so that the dyestuff always remains dissolved.

A dyesuff solution of 10 liters is obtained which is separated from the excess acylating agent, adjusted to a pH of 7.0 by the addition of acetic acid and the dyestuff is precipitated by adding 2.5 liters of a concentrated sodium chloride solution while stirring.

After filtering off with suction and drying at 50° C., a clear turquoise-blue dyestuff is obtained, which is fixed on cotton from a soda-alkaline solution at 70–90° C. with a very good yield and very good fastness to washing.

By using the NiPc-3,3',3''-trisulphonic acid chloride as starting material, a turquoise-blue shade of equally valuable properties is obtained, which is only slightly more greenish.

Example 283

In 150 parts by volume of concentrated hydrochloric acid are dissolved 12.5 parts of 3-amino-4-sulphobenzyl-N-methylamine and 4 parts of sodium nitrite in 20 parts by volume of water are added dropwise to the solution. The resultant clear diazonium salt solution is added dropwise at 30–35° C. to an aqueous solution of the equimolar amount of 1-N-benzoyl-amino-8-hydroxynaphthalene-4,6-disulphonic acid and 16 parts of sodium bicarbonate in 200 parts by volume of water.

The dyestuff partially precipitates and is redissolved by the addition of 2000 parts by volume of water. 15 parts of 3,5-dichloro-1,2-isothiazole-4-carboxylic acid chloride are then added at 40–50° C. The pH is kept between 7 and 8 by the drop-wise addition of a sodium carbonate solution. When the acylation is completed, as can be recognized from the consumption of sodium carbonate, the dyestuff is separated with 10% of sodium chloride, filtered off with suction, pressed off and dried in a vacuum drier at 40° C. The bluish-red dyestuff obtained corresponds, in the form of the free acid, to the formula

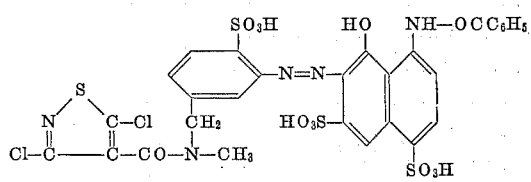

Example 284

The dyestuff obtained from 6-nitro-2-diazo-1-hydroxybenzene-4-sulphonic acid and 2-hydroxynaphthalene by soda-alkaline coupling, 38.9 parts, is stirred at a pH of 8 in 200 parts of water at a temperature of 70–80° C. 67.9 parts of the chromium complex compound of the azo dyestuff from 4-chloro-2-diazo - 1 - hydroxybenzene-6-sulphonic acid and 1-amino-8-hydroxy-naphthalene-3,6-disulphonic acid containing 1-chromium atom per dyestuff molecule are introduced into this suspension, while maintaining a pH between 7 and 9 by the dropwise addition of a sodium carbonate solution. After 20 minutes at 70–80° C., a dark blue solution has formed. The paper chromatogram shows that a homogeneous mixed complex has formed. The mixed complex is acylated within 30 minutes at 45° C. and a pH of 4–6 with 21.6 parts of 3,5-dichloro-1,2-isothiazole-4-carboxylic acid chloride, the pH being kept within the stated range by the dropwise addition of a sodium carbonate solution. The acylated dyestuff is salted out with 20% of potassium chloride, filtered off and dried at 50° C. A dark powder is obtained which dissolves in water, with a blue-grey color.

In the form of the pentasodium salt, the dyestuff corresponds to the formula

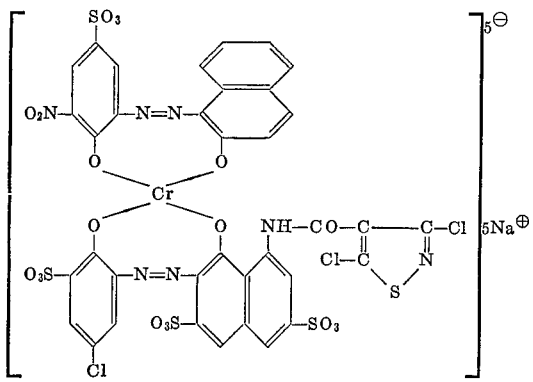

It dyes cotton by the methods described in Examples 1–3, in grey to black shades.

Valuable dyestuffs can also be obtained in the manner described in the present example from the starting components listed in the following table. For the production of these dyestuffs, the azo dyestuff which contains the reactive group in the 2:1 mixed complex is always used as 1:1 chromium complex.

tion is adjusted to a pH of 8 and 2.2 g. of 3,5-dichloro-1,2-isothiazole-4-carboxylic acid chloride are introduced in small portions at 40–45° C. At the same time, a dilute sodium hydroxide solution is added dropwise in such a manner that a pH of 7.5–8.5 is maintained during the reaction. The mixture is further stirred at 40–45° C. until the starting material has completely disappeared, filtered off with suction from excess isothiazole-carboxylic acid chloride and salted at 40° C. with a sufficient amount of solid sodium chloride to obtain an approximately 10% sodium chloride solution. The product is filtered off with suction, washed with a little sodium chloride solution and the resultant dyestuff of the formula

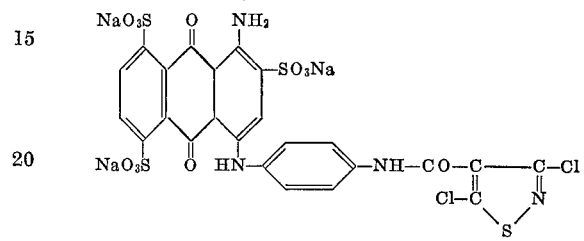

is dried below 40° C. in a vacuum. About 8.5 g. of the dyestuff are obtained in the form of blue-green needles.

The dyestuff dyes cotton by the methods customary for reactive dyestuffs in intense blue-green shades of good fastness to wet processing and light.

The 1-amino-4 - (4' - aminophenyl - amino) - anthraquinone-2,5,8-trisulphonic acid used as starting material is obtained as follows: 31.2 g. of p-phenylene-diamine are introduced under nitrogen into a solution of 62 g. of 1-amino-4-bromo-anthraquinone-2,5,8 - trisulphonic acid sodium salt and 12 g. of sodium carbonate and stirred with the addition of a CuCl paste at 40° C., until disulphonated bromoaminoacid is no longer indicated. The

| Ex. No. | 1=1 Chromium complex (listed in terms of reaction components) | Metal-free dyestuff (listed in terms of coupling components) | Shade on cotton |
|---|---|---|---|
| 285 | 4-nitro-2-amino-1-hydroxybenzene-6-sulphonic acid→1-amino-8-hydroxynaphthalene-3,6-disulphonic acid. | 4-nitro-2-amino-1-hydroxybenzene→2-hydroxy-naphthalene. | Black. |
| 286 | do | do | Do. |
| 287 | do | do | Do. |
| 288 | do | 4-nitro-2-amino-1-hydroxybenzene→2-hydroxy-naphthalene-6-sulphonic acid. | Do. |
| 289 | do | do | Do. |
| 290 | do | 4-nitro-2-amino-1-hydroxybenzene→1-hydroxy-naphthalene-4-sulphonic acid. | Navy blue. |
| 291 | do | 6-nitro-2-amino-1-hydroxybenzene-4-sulphonic-acid→2-hydroxy hybroxy-naphthalene. | Black. |
| 292 | do | 4-nitro-2-amino-1-hydroxybenzene→1-acetylamino-7-hydroxy-naphthalene. | Do. |
| 293 | do | 6-nitro-1-amino-2-hydroxynaphthalene-4-sulphonic acid→2-hydroxynaphthalene. | Do. |
| 294 | 4-nitro-2-amino-1-hydroxybenzene-6-sulphonic acid→1-amino-8-hydroxynaphthalene-4,6-disulphonic acid. | 4-nitro-2-amino-1-hydroxynaphthalene-6-sulphonic acid→2-hydroxybenzene. | Do. |
| 295 | 4-chloro-2-amino-1-hydroxybenzene-6-sulphonic acid→1-amino-8-hydroxynaphthalene-3,6-disulphonic acid. | 4-nitro-2-amino-1-hydroxybezene→2-hydroxynaphthalene. | Blue-black. |
| 296 | do | do | Do. |
| 297 | do | 4-nitro-2-amino-1-hydroxybenzene→2-hydroxynaphthalene-6-sulphonic acid. | Do. |
| 298 | do | 4-chloro-2-amino-1-hydroxybenzene→2-hydroxynaphthalene. | Navy blue. |
| 299 | do | 4-nitro-2-amino-1-hydroxybenzene→1-acetylamino-8-hydroxy-naphthalene-3,6-disulphonic acid. | Blue. |
| 300 | do | 4-nitro-2-amino-1-hydroxybenzene→1-amino-8-hydroxy-naphthalene-2,4-disulphonic acid. | Navy blue. |
| 301 | do | 6-nitro-1-amino-2-hydroxynaphthalene-4-sulphonic acid→2-hydroxynaphthalene. | Blue-black. |
| 302 | do | 2-aminobenzene-1-carboxylic acid-5-sulphonic acid→1-phenyl-3-methyl-5-pyrazolone. | Grey-green. |
| 303 | 4-nitro-2-amino-1-hydroxybenzene-6-sulphonic acid→1-amino-8-hydroxynaphthalene-3,6-disulphonic acid. | 6-nitro-1-amino-2-hydroxynaphthalene-4-sulphonic acid→2-hydroxynaphthalene. | Black. |
| 304 | 4-chloro-2-amino-1-hydroxybenzene-6-sulphonic acid→1-amino-8-hydroxynaphthalene-3,6-disulphonic acid. | 4-chloro-2-amino-1-hydroxybenzene→1-(4'-sulphophenyl)-3-methyl-5-pyrazolone. | Violet. |
| 305 | 4-methyl-2-amino-1-hydroxybenzene-6-sulphonic acid→1-amino-8-hydroxynaphthalene-3,6-disulphonic acid. | 4-chloro-2-amino-1-hydroxybenzene→2-hydroxynaphthalene-6-sulphonic acid. | Reddish-blue. |
| 306 | 4-nitro-2-amino-1-hydroxybenzene-6-sulphonic acid→1-amino-8-hydroxynaphthalene-3,6-disulphonic acid. | 5-nitro-2-amino-1-hydroxybenzene→2-hydroxynaphthalene-6-sulphonic acid. | Black. |
| 307 | do | 4-nitro-2-amino-1-hydroxybenzene→2-hydroxynaphthalene-8-sulphonic acid. | Do. |
| 308 | do | 4-nitro-2-amino-1-hydroxybenzene→1-hydroxynaphthalene-5-sulphonic acid. | Do. |
| 309 | do | 6-nitro-4-chloro-1-hydroxybenzene→1-hydroxynaphthalene-5-sulphonic acid. | Do. |

Example 310

In 180 ml. of water are dissolved at 40° C., 6 g. of 1-amino-4-(4'-aminophenyl - amino)-anthraquinone-2,5,8-trisulphonic acid in the form of the sodium salt, the solution is then mixed with dilute hydrochloric acid, the precipitated dyestuff is filtered off with suction, washed with dilute hydrochloric acid, treated in 300 ml. of water with sufficient dilute sodium hydroxide solution that it just dissolves and that the dyestuff precipitates in the hot in the form of the sodium salt; the product is then washed and dried.

Example 311

The trisodium salt of the dyestuff obtained by soda-alkaline coupling from diazotized 4-chloro-2-amino-1-hydroxybenzene-6-sulphonic acid and 1-amino - 8 - hydroxynaphthalene-3,6-disulphonic acid, 62 parts, is mixed in 300 parts of water at 70–80° C. and at a pH of 8–9 with 54.2 parts of the 1:1 chromium complex of the dyestuff from 6-nitro-1-diazo-2 - hydroxynaphthalene - 4-sulphonic acid and 2-hydroxynaphthalene. A deep blue solution is formed after 10 minutes.

The mixed complex is acylated within about 15 minutes at 45° C. and a pH of 4–6 with 21.6 parts of 3,5-dichloro-1,2-isothiazole-4-carboxylic acid chloride. The pH value is kept constant by the dropwise addition of a sodium carbonate solution. The acylated dyestuff is separated with 20% of sodium chloride, filtered off with suction and dried at 50° C. and has the formula

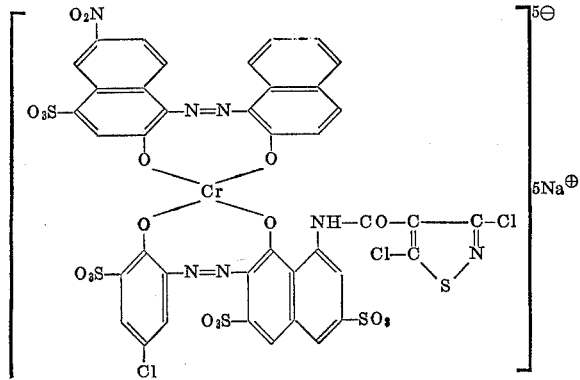

A blue-black print of excellent fastness to light and washing is obtained on cotton by the known processes.

In the examples, those dyestuffs illustrated by formulae, which contain sulphonic acid groups, are generally given in the form of the sodium salts of the sulphonic acids. From these, the free acids (—SO$_3$H) or other salts can be produced in a known manner.

We claim:

1. A dyestuff of the formula:

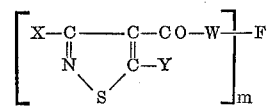

wherein F stands for a water-soluble dyestuff selected from the group consisting of nickel phthalocyanine and copper phthalocyanine dyestuffs; W is a bridge member joined to an aromatic nuclear carbon atom of F and selected from the class consisting of:

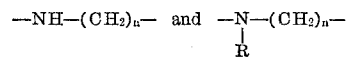

wherein the N atom is connected with the CO grouping; R is lower alkyl or lower alkyl substituted by OH; and $n$ is 0 or 1; X and Y are selected from the class consisting of chlorine and bromine; and $m$ is a number ranging from 1 to 2.

2. A dyestuff of claim 1 wherein W is —NR— and R is hydrogen or methyl.

3. The dyestuff of claim 1 having the formula

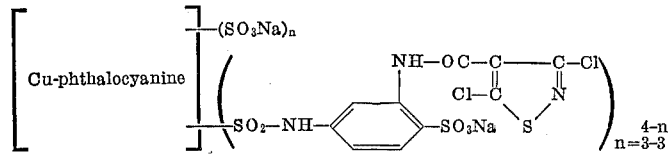

References Cited

UNITED STATES PATENTS 2,396,145   3/1946   Anders et al. _____ 260—158 XR
3,299,084   1/1967   Simonnet et al. _____ 260—303

FOREIGN PATENTS 417,980   10/1934   Great Britain.
236,708    6/1945   Switzerland.
341,247   11/1959   Switzerland.

FLOYD D. HIGEL, Primary Examiner

U.S. Cl. X.R.

8—39, 40, 41, 42, 43, 50, 51, 54, 54.2, 57, 62, 63, 71; 117—138.8, 144; 260—8, 37, 145, 146, 147, 158, 249.5, 256.5, 302, 303, 306

UNITED STATES PATENT OFFICE
CERTIFICATE OF CORRECTION

Patent No. 3,480,641　　　　　　　　　Dated　　November 25, 1969

Inventor(s)　Karl-Heinz Schundehutte, et al.　　Page 1

It is certified that error appears in the above-identified patent and that said Letters Patent are hereby corrected as shown below:

| Column | Line | Error |
|---|---|---|
| 1 | 10 | "appilcation" should read --- application |
| 1 | 44 | "of" should read --- or --- |
| 1 | 48 | "azo" should read --- aza --- |
| 3 | 34 | "collars" should read --- rollers --- |
| 6 | formula | a bond from "NaO$_3$S" to the structure is missing |
| 7 | Example 14 under Diazo component heading | "1-amino:2-" should read --- 1-amino-2- --- |
| 7 | Example 22 formula | 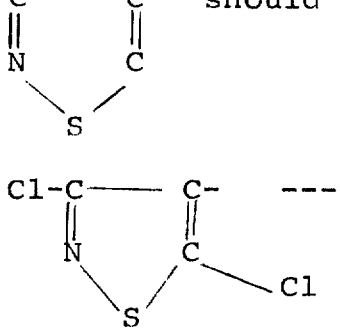 |

UNITED STATES PATENT OFFICE
CERTIFICATE OF CORRECTION

Patent No. 3,480,641        Dated November 25, 1969

Inventor(s) Karl-Heinz Schundehutte, et al. Page 2

It is certified that error appears in the above-identified patent and that said Letters Patent are hereby corrected as shown below:

| Column | Line | Error |
|---|---|---|
| 8 | Example 17 under Coupling component heading | The underline connecting "amino-5-" should be changed to a dash |
| 8 | Example 21 under Coupling component heading | "2-amino:5-hydroxy" should read --- 2-amino-5-hydroxy --- |
| 8 | Example 28 under Coupling component heading | "1-(3'-,5'-dichloro-" should read --- 1-(3',5'-dichloro- --- |
| 8 | Example 30 under Coupling component heading | "3-methylpyrazolene-5" should read --- 3-methylpyrazolone-5 --- |
| 8 | Example 32 under Coupling component heading | "disulpho-naphtyhl-" should read --- disulpho-naphthyl- --- |

UNITED STATES PATENT OFFICE
CERTIFICATE OF CORRECTION

Patent No. 3,480,641  Dated November 25, 1969

Inventor(s) Karl-Heinz Schundehutte, et al.  Page 3

It is certified that error appears in the above-identified patent and that said Letters Patent are hereby corrected as shown below:

| Column | Line | Error |
|---|---|---|
| 8 | Example 34 under Coupling component heading | "acetalymino" should read --- acetylamino --- |
| 8 | Example 35 second formula | "$NaC_3S$" should read --- $NaO_3S$ --- |
| 9 | Example 43 Amino dyestuff heading | "4,6.disulphonic" should read --- 4,6-disulphonic --- |
| 9 | 24 | "tretra-" should read --- tetra- --- |
| 9 | 40 | "isoethiazole" should read --- isothiazole --- |
| 9 | Example 49 formula | 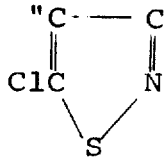 |

PO-1050
(5/69)

UNITED STATES PATENT OFFICE
CERTIFICATE OF CORRECTION

Patent No. 3,480,641  Dated November 25, 1969

Inventor(s) Karl-Heinz Schundehutte, et al.    Page 4

It is certified that error appears in the above-identified patent and that said Letters Patent are hereby corrected as shown below:

| Column | Line | Error |
|---|---|---|
| 9 | 66 | "ts" should read --- as --- |
| 10 | Example 40 Amino dyestuff heading | "dissulphonic" should read --- disulphonic --- |
| 10 | Example 43 Complex-linked heavy metal heading | "Ct" should read --- Cr --- |
| 10 | 34 | "4,4-diamino" should read --- 4,4'-diamino --- |
| 10 | 35 | "carbzoxylic" should read --- carboxylic --- |
| 11 | 35 | "nad" should read --- and --- |

UNITED STATES PATENT OFFICE
CERTIFICATE OF CORRECTION

Patent No. 3,480,641　　　　　　　　　　Dated November 25, 1969

Inventor(s) Karl-Heinz Schundehutte, et al.　　Page 5

It is certified that error appears in the above-identified patent and that said Letters Patent are hereby corrected as shown below:

| Column | Line | Error |
|---|---|---|
| 12 | Example 55 formula | 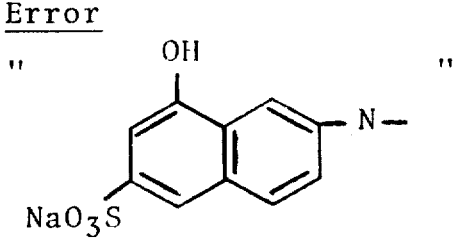 should read 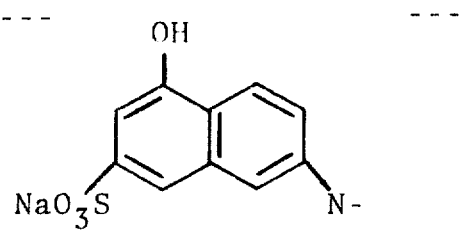 |
| 14 | 31 | "2,6,8-" should read --- -3,6,8- --- |
| 16 | Example 125 Coupling component heading | "Anine" should read --- Aniline --- |

UNITED STATES PATENT OFFICE
CERTIFICATE OF CORRECTION

Patent No. 3,480,641        Dated November 25, 1969

Inventor(s) Karl-Heinz Schundehutte, et al.        Page 6

It is certified that error appears in the above-identified patent and that said Letters Patent are hereby corrected as shown below:

| Column | Line | Error |
|---|---|---|
| 16 | Formula | 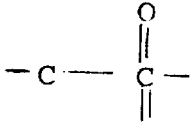 should read --- 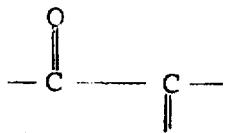 --- |
| 22 | Example 197 Azo component heading | "2.2'-bisulphonic" should read --- 2,2'-disulphonic --- |
| 22 | Example 219 Azo component heading | "3-hybroxyacetylamino-" should read --- 3-hydroxyacetylamino- --- |
| 23 | Example 226 | "-3'-minophenyl)" should read --- -3'-aminophenyl) --- |
| 23 | Example 232 | "-2,4'5" should read --- -2,4'-5- --- |
| 23 | 69 | "and the" should read --- and by the --- |
| 27 | Example 268 Diazo component heading | "2-hydro" should read --- 2-hydroxy --- |

UNITED STATES PATENT OFFICE
CERTIFICATE OF CORRECTION

Patent No. 3,480,641      Dated November 25, 1969

Inventor(s) Karl-Heinz Schundehutte, et al.      Page 7

It is certified that error appears in the above-identified patent and that said Letters Patent are hereby corrected as shown below:

| Column | Line | Error |
|---|---|---|
| 27 | Example 279 formula | 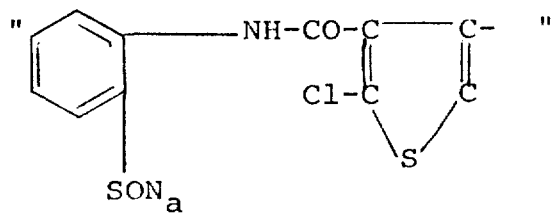 | should read ---

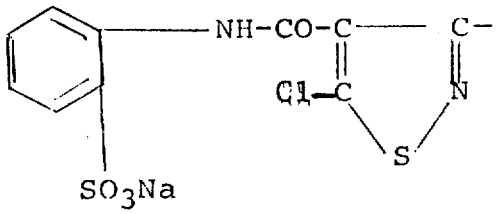

---

| | | |
|---|---|---|
| 28 | Example 268 Azo component heading | "acib" should read --- acid --- |
| 28 | Shade heading Example 269 | "Reb." should read --- Red. --- |
| 28 | Example 273 and 274 Azo heading | "hybrozy" should read --- hydroxy --- |

UNITED STATES PATENT OFFICE
CERTIFICATE OF CORRECTION

Patent No. 3,480,641     Dated November 25, 1969

Inventor(s) Karl-Heinz Schundehutte, et al.     Page 8

It is certified that error appears in the above-identified patent and that said Letters Patent are hereby corrected as shown below:

| Column | Line | Error |
|---|---|---|
| 28 | 27 | "in" should read --- is --- |
| 29 | 3 | "diazo" should read --- disazo --- <br> "addi" should read --- addi- --- |
| 29 | 10 | "diazo" should read --- disazo --- |
| 29 | Example 281 formula | " 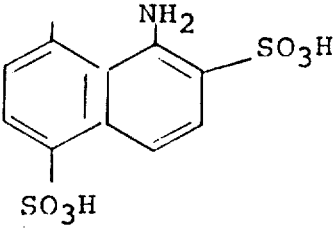 should read --- 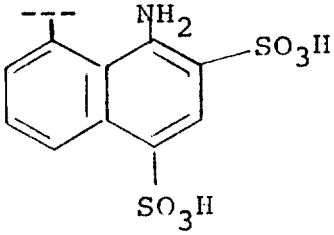 --- |
| 31 | Table heading | "1=1" should read --- 1:1 --- |
| 31 | Example 303 | "disulphonie acid" should read --- disulphonic acid --- |
| 32 | Example 291 | delete hybroxy |
| 32 | Example 295 | "1-hydroxybezene" should read --- 1-hydroxybenzene --- |

UNITED STATES PATENT OFFICE
CERTIFICATE OF CORRECTION

Patent No. 3,480,641　　　　　　　　　Dated November 25, 1969

Inventor(s) Karl-Heinz Schundehutte, et al.　　　Page 9

It is certified that error appears in the above-identified patent and that said Letters Patent are hereby corrected as shown below:

| Column | Line | Error |
|---|---|---|
| 32 | Example 310 formula | " 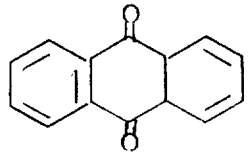 " should read --- 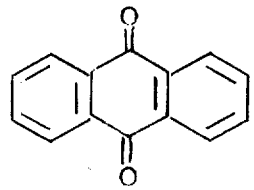 --- |
| 34 | Claim 3 | "n=3-3" should read --- n=2-3 --- |

SIGNED AND SEALED
JUL 21 1970

(SEAL)
Attest:

Edward M. Fletcher, Jr.
Attesting Officer

WILLIAM E. SCHUYLER, JR.
Commissioner of Patents